United States Patent [19]
Salinger et al.

[11] Patent Number: 6,026,305
[45] Date of Patent: Feb. 15, 2000

[54] GEOGRAPHICAL LOCATION SYSTEM AND METHOD FOR LOCATING RADIOTELEPHONE ENGAGED IN A CALL

[75] Inventors: Sheldon N. Salinger, Los Altos; Douglas G. Forster, Grass Valley, both of Calif.

[73] Assignee: GTE Government Systems Corporation, Mt. View, Calif.

[21] Appl. No.: 08/868,346

[22] Filed: Jun. 3, 1997

[51] Int. Cl.[7] .................................................. H04Q 7/22
[52] U.S. Cl. .......................................... 455/456; 455/422
[58] Field of Search ..................................... 455/403, 404, 455/422, 456–457, 435, 521; 340/988, 989, 991

[56] References Cited

U.S. PATENT DOCUMENTS

| | | | |
|---|---|---|---|
| 5,515,419 | 5/1996 | Sheffer | 455/521 X |
| 5,600,706 | 2/1997 | Dunn et al. | 455/456 |
| 5,602,903 | 2/1997 | LeBlanc et al. | 455/456 |
| 5,613,205 | 3/1997 | Dufour | 455/440 |

*Primary Examiner*—William G. Trost
*Attorney, Agent, or Firm*—Leonard Charles Suchyta

[57] ABSTRACT

A cellular radiotelephone (24) engages in a call over a bidirectional channel (32) involving a cellsite base station (68) within a cellular network (22). Upon receipt of a notice (46), a geographical location computer (20) is activated and transmits a call locate instruction identifying the bidirectional channel (32) to a plurality of dual channel receivers (56, 58, 60, and 61). The dual channel receivers (56, 58, 60, and 61) are then tuned to the bidirectional channel (32) and receive the forward (78) and reverse (82) location signals over forward and reverse directions of the bidirectional channel (32). A probable location of the cellular radiotelephone (24) is determined by measuring phase differences of the forward (78) and reverse (82) location signals at each of the dual channel receivers (56, 58, 60, and 61).

27 Claims, 9 Drawing Sheets

GEOGRAPHICAL LOCATION SYSTEM AND METHOD FOR LOCATING RADIOTELEPHONE ENGAGED IN A CALL

TECHNICAL FIELD OF THE INVENTION

The present invention relates generally to cellular radiotelephones. More specifically, the present invention relates to a system and method for locating a cellular radiotelephone engaged in a call.

BACKGROUND OF THE INVENTION

The proliferation of cellular radiotelephones, their technology and their usage, has raised the need of locating these cellular radiotelephones during a call. The dispatching of police/fire/ambulance services to a location can be accomplished by quickly and accurately determining the location of a cellular radiotelephone engaged in a 911-emergency call. Other applications could include tracing of unauthorized radiotelephone usage, providing location data for location sensitive billing, aiding in police investigations, and the like.

Previously installed cellular systems have little capability in this regard. For example, in Advanced Mobile Phone Service (AMPS) systems, the specific cell in which a radiotelephone is located can be identified by determining which base station antenna was used to serve the call. However, a cell can be as large as 3–5 miles in radius, making this information practically useless for accurately determining the location of the radiotelephone within the cell. Many of the dense urban cell sites are now much smaller and many of the urban/suburban cell sites are now sectored. Sectored antennas are used to limit a channel's service area to just one sector of a cell, thus, the coverage areas of a sectored cell are now smaller. However, the area even in these sectored cells can still be more than one square mile. Since it is often necessary that the location of the cellular radiotelephone be known within 125 meters, locating a radiotelephone within a one square mile coverage area is not accurate enough.

Conventional electronic location systems are known to track or locate radio transmitters, however, these location systems may not be accurate enough for the needs of the cellular radiotelephone industry. The accuracy of one such conventional system is reduced because the system utilizes cellular radiotelephone signals available on the control channel for location purposes. Control channel signals are of very short duration, sometimes a second or less. Such a system requires more time than this to integrate the signal to determine an accurate location.

Another problem arises when location tracking is desired and the location system being employed utilizes the control channel signals to locate the radiotelephone. The cellular radiotelephone signals used for location purposes in such systems are available only during call setup, making it impossible for repeating location measurements. Additional location measurements may be desired if the caller is moving within the cell or moves into another cell while engaged in a call over the radiotelephone. This condition might arise, for example, if the caller is fleeing from a dangerous situation or if the caller, targeted in a police investigation, is moving about in a vehicle.

The problem of accurately locating a cellular radiotelephone may be exacerbated in the presence of multipath interference. Signal paths to the cellular radiotelephone may include reflections off of buildings in the area. Such reflections can cause the apparent path distance to a fixed cell site to differ from the straight-line distance between the fixed base station and the cellular radiotelephone. This is known as multipath interference. In the presence of multipath interference, some prior art systems may require the presence of location signals to be available even longer to accommodate longer integration times. This may not be possible if radiotelephone signals used for location purposes are of very short duration.

A problem exists with location systems that require excessive equipment or equipment that is incompatible with the existing cellular infrastructure. Excessive equipment in location systems increases costs and implementation time. For example, such systems as GPS and LORAN employ a method for locating transmitters using time difference of arrival (TDOA). The application of GPS receivers or LORAN to cellular radiotelephones includes measuring the time of arrival of the same signal at a multiplicity of locations and comparing the times to determine how long the signal took to reach the receiver. One such system requires the use of a steerable antenna array which is not compatible with existing omnidirectional antenna structures in use with existing cellular base stations. To implement this system additional antenna arrays may be needed which could drive up the cost of implementing such a location system.

Thus, there remains a need for a location system that minimizes changes to existing equipment while providing a method for accurately locating a cellular radiotelephone engaged in a call. Such a system should be able to repeat location measurements as desired throughout the duration of the call even following a cellsite handover of the call.

SUMMARY OF THE INVENTION

Accordingly, it is an advantage of the present invention to provide a method and system for accurately determining location of a cellular radiotelephone engaged in a call.

Another advantage of this invention is to be able to repeat location measurements as desired throughout the duration of a call.

Another advantage of this invention is to mitigate the deleterious effects of error components to location measurements.

Another advantage of this invention is to minimize changes to existing equipment which is normally used for typical cellular radiotelephone communication.

The above and other advantages of the present invention are carried out in one form by a method of operating a geographical location system in a cellular network to determine the location of a cellular radiotelephone engaged in a call involving a cellsite base station, the call being conducted over a bidirectional channel having forward and reverse directions. The method calls for transmitting a forward location signal during the call over the forward direction of the bidirectional channel. The method causes a geographical location system to tune a plurality of dual channel receivers to the bidirectional channel, and the forward location signal and a reverse location signal are received over the bidirectional channel at each of the dual channel receivers. The probable location of the cellular radiotelephone is then calculated in response to the forward and reverse location signals received at each of the dual channel receivers.

In another form, the present invention provides a geographical location system in a cellular network for determining the location of a cellular radiotelephone engaged in a call through a cellsite base station. The system includes a geographical location computer activated upon receipt of a notice identifying a bidirectional channel over which the call is being conducted and a cell identification code defining a cell in which the call was detected. The bidirectional channel has a forward direction and a reverse direction and the geographical location computer transmits a call locate instruction identifying the bidirectional channel upon activation. The system also includes a plurality of dual channel receivers, located proximate to the cell in which the call was detected. The dual channel receivers are in data communication with the geographical location computer, for receiving a forward location signal over the forward direction of the bidirectional channel and a reverse location signal over the reverse direction of the bidirectional channel in response to the call locate instruction.

In yet another form, the present invention provides a method of operating a geographical location system in an advanced mobile phone service (AMPS) network having A-side and B-side cellular systems to determine the location of a cellular radiotelephone engaged in a call. The method calls for detecting a call from the cellular radiotelephone through either an A-side cellsite base station or a B-side cellsite base station, the call being conducted over a bidirectional channel having a forward voice channel and a reverse voice channel. The method further calls for transmitting a supervisory audio tone (SAT) during the call over the forward voice channel of the bidirectional channel, the call conveying the SAT concurrently with subscriber conversation signals, tuning a plurality of dual channel receivers located at A-side and B-side cellsites, and receiving the SAT transmitted from the A-side or B-side cellsite base station over the forward voice channel at each of the dual channel receivers. The method further calls for receiving a transponded SAT from the radiotelephone over the reverse voice channel at each of the dual channel receivers, measuring a phase difference, at each of the dual channel receivers to determine an interpath time delay, and calculating a probable location of the radiotelephone in response to the interpath time delays and locations of the A-side and B-side cellsites where the dual channel receivers are located.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
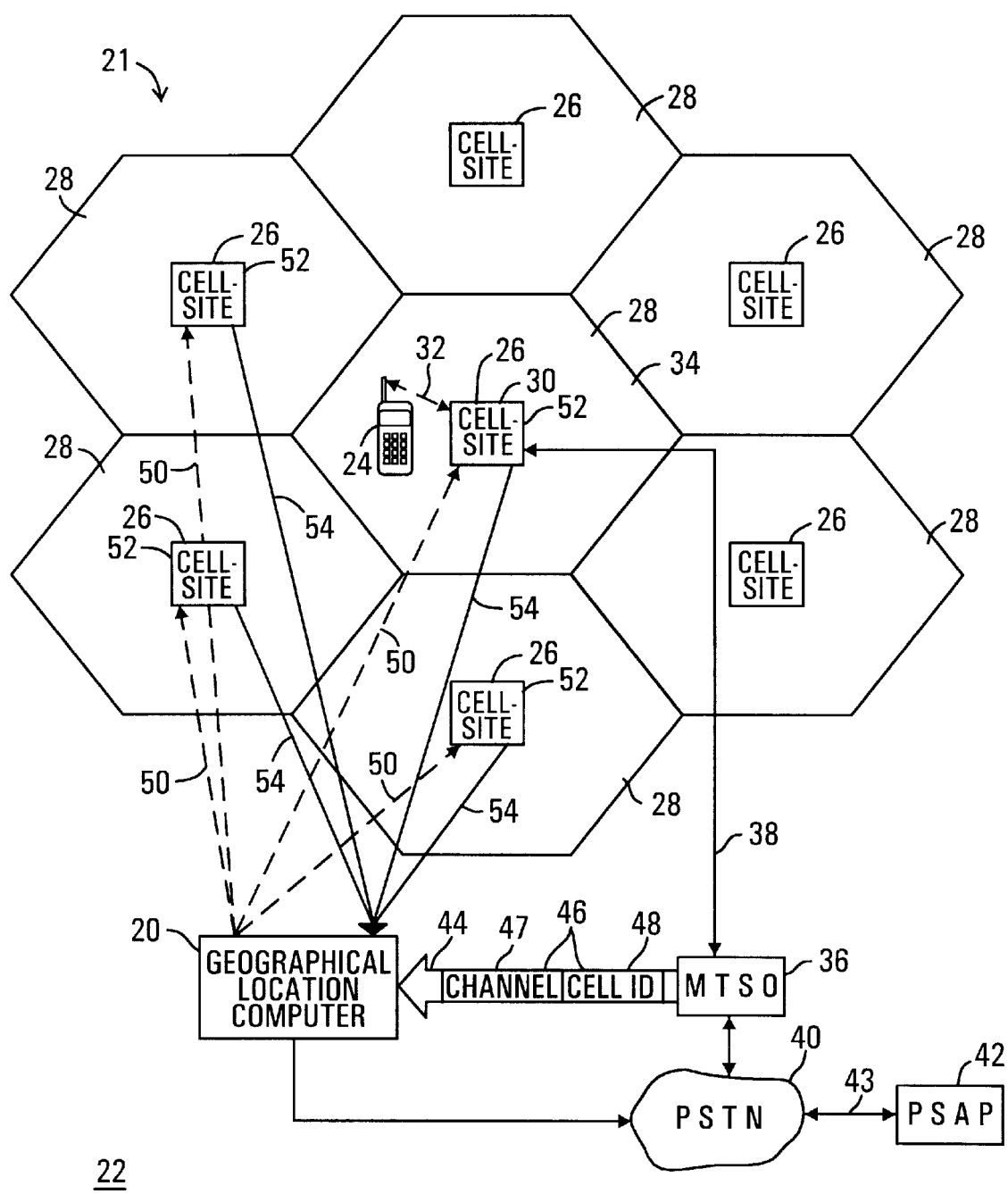
FIG. 1 shows an illustration of a geographical location computer in a cellular network for locating a cellular radiotelephone engaged in a call.

FIG. 1 shows an illustration of a geographical location computer 20 in a cellular network 22 for locating an exemplary cellular radiotelephone 24 engaged in a call. Geographical location computer 20, in combination with a plurality of dual channel receivers (discussed below) and dual channel receiver controllers (discussed below) form a geographical location system 21 in cellular network 22. Cellular network 22 includes cellsites 26, each of which manages calls within cells 28. A cellsite 30 is in radio communication over a bidirectional channel 32 with radiotelephone 24 located in a cell 34. Although FIG. 1 shows a single cellular radiotelephone 24, any number of cellular radiotelephones 24 may operate in this and other similar environments. Cellular radiotelephone 24 can be configured as a conventional portable unit which is easily carried from place to place, thus able to freely move about within cellular network 22.

Conversation signals (discussed below) are processed at cellsite 30 and transferred to a mobile telephone switching office (MTSO) 36 via a conventional link 38. Those skilled in the art will recognize that radio communication signals are processed at all of the cellsites 26 and are transferred to MTSO 36 via conventional links. These links are not shown for clarity of illustration. MTSO 36 in cellular network 22 controls and supervises the connection of cellular radiotelephone 24 to a public switched telephone network (PSTN) 40. Link 38 could be through a conventional land line or a microwave link, although nothing in the present invention requires any one type of link over the other.

FIG. 1 shows a single MTSO supporting a single A-side or B-side cellular system. In accordance with conventional advanced mobile phone services (AMPS) cellular telephone methodology, cellular network 22 can be covered by both an A-side system and a B-side system. This overlapping of A-side systems and B-side systems results from FCC rules which are intended to encourage competition in the provision of cellular radiotelephone services. No interference between communications taking place in overlapping cells occurs because A-side cellular systems operate only on one set of frequencies, or channels, assigned by the FCC, and B-side cellular systems operate only on an entirely different set of channels. Thus, cellular radiotelephones may be subscribers to either an A-side or a B-side system, and cellular radiotelephone 24 may be engaged in a call over either the A-side system or the B-side system. For clarity of illustration, the preferred embodiment of the present invention is described in connection with a single A or B side system, however, those skilled in the art will recognize that A and B side systems could be working cooperatively to provide cellular radiotelephone 24 location information.

In the example scenario depicted in FIG. 1, cellular radiotelephone 24 is engaged in an emergency call with a public safety answering position (PSAP) 42 which is linked to PSTN 40 via conventional landlines 43. MTSO 36 is connected to geographical location computer 20 via an activation link 44. In the preferred embodiment, geographical location computer 20 is a conventional microprocessor based computer system that couples to link 44 and operates programs resident in a memory portion of computer 20.

When MTSO 36 receives notification that cellular radiotelephone 24 is engaging in an emergency call with PSAP 42, MTSO 36 sends a notice 46 over activation link 44 to locate radiotelephone 24. Notice 46 includes a channel code (CHANNEL) 47 identifying bidirectional channel 32 over which the call is being conducted and a cell identification code (CELL ID) 48 identifying a cellsite base station (discussed below) involved in the emergency call. MTSO 36 may be signaled by PSAP 42 to locate radiotelephone 24 or MTSO 36 may recognize emergency calls and initiate call location processing automatically. While the preferred embodiment of the present invention is described in terms of emergency calls, nothing limits call location to emergency calls. For example, call location can be initiated in response to court-approved phone taps or for location sensitive billing purposes.

Upon receipt of notice 46 over activation link 44 identifying bidirectional channel 32 and CELL ID 48, geographical location computer 20 transmits a call locate instruction over a command link 50, identifying bidirectional channel 32 over which the call is being transmitted. The call locate instruction may be transmitted to selected cellsites 52 or may be transmitted to all cellsites 26 proximate to cell 34. In response to the call locate instruction, each of a plurality of dual channel receiver controllers (discussed below) configures dual channel receivers (discussed below) to detect bidirectional channel 32, and resulting timing parameters are transmitted through a data link 54 to geographical location computer 20. Geographical location computer 20 obtains the timing parameters from data link 54 and calculates a probable location (discussed below). The probable location is then transferred through PSTN 40 to PSAP 42.

In FIG. 1, command link 50 conveying the call locate instruction and data link 54 conveying the timing parameters are shown to be in radio communication with geographical location computer 20. Those skilled in the art will recognize that the call locate instruction and timing parameters may be transmitted through MTSO 36 over a dedicated bidirectional control channel or some other bidirectional channel assigned to this task. Additionally, geographical location computer 20 is illustrated as a system separate from cellsites 26 and MTSO 36 and the probable location is conveyed directly from geographical location computer 20 to PSTN 40. In another embodiment, a geographical location computer 20 may be located at cellsite 30 and the probable location may be transmitted over conventional link 38 through MTSO 36 to PSAP 42.

Figure 2:
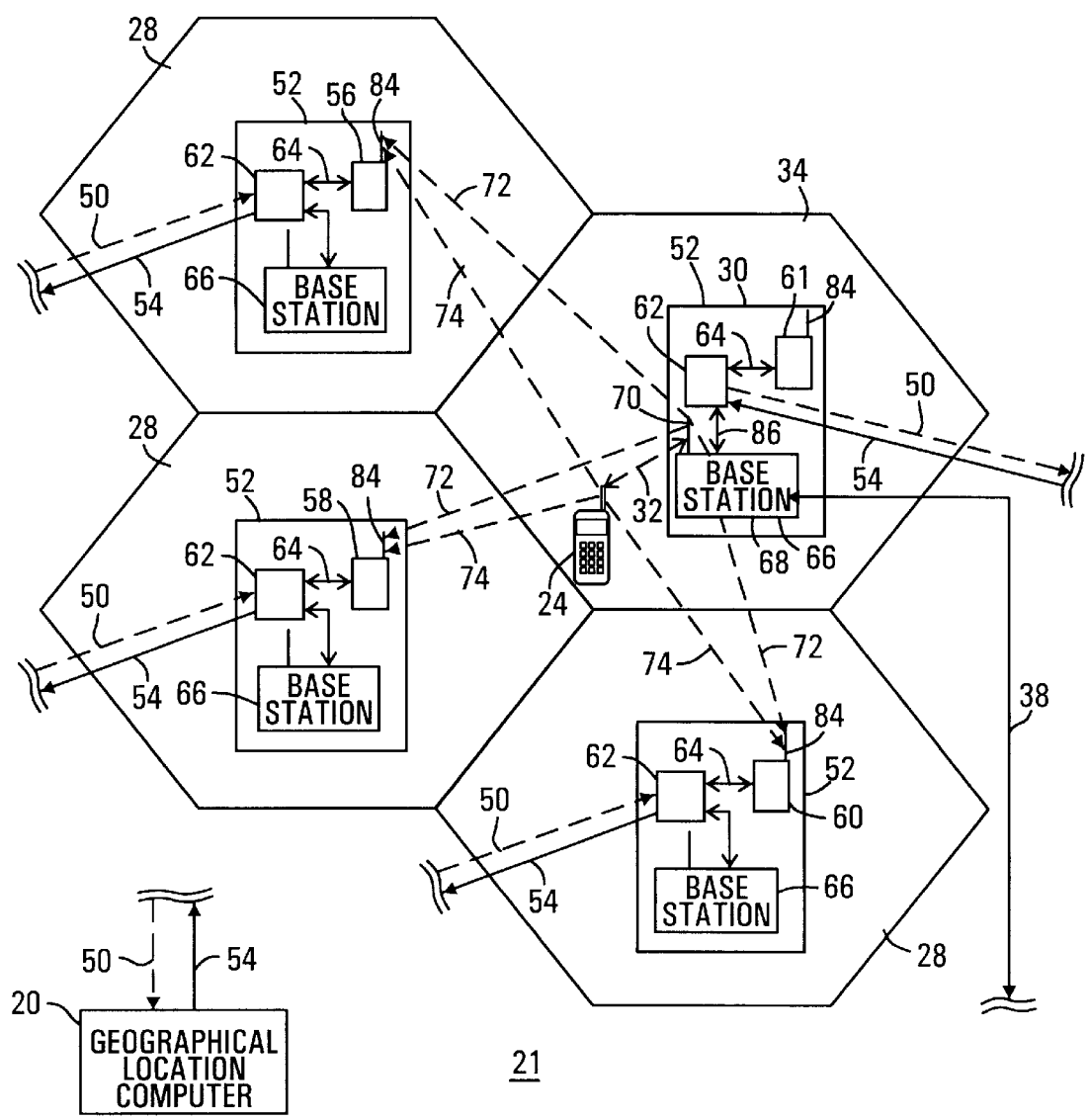
FIG. 2 shows an illustration of dual channel receivers and dual channel receiver controllers located at selected cellsites of a geographical location system.

FIG. 2 shows an illustration of dual channel receivers 56, 58, 60, and 61 and dual channel receiver controllers 62 located at selected cellsites 52 (FIG. 1) of geographical location system 21. Dual channel receivers 56, 58, 60, and 61 are linked to dual channel receiver controllers 62 via bus lines 64 and are located proximate to conventional cellsite base stations 66. Those skilled in the art will recognize that a dual frequency receiver controller and a dual frequency receiver may be a single operational unit located at each of cellsites 28 (FIG. 1) or other convenient locations. Other convenient locations could be units mounted to multiple buildings in dense urban areas. In the preferred embodiment, dual frequency receiver controllers and dual frequency receivers are located at cellsites because those areas are already set up and designated for cellular telephony.

In the preferred embodiment, each of dual frequency receiver controllers 62 is a conventional microprocessor based computer system that operates in accordance with programs resident in a memory portion of controller 62. Each of dual frequency receivers 56, 58, 60, and 61 are configured to be tuned to and receive two separate frequencies in the 800 MHz range at any given time. The frequencies are the transmit channel designations for base stations and radiotelephones assigned to the AMPS A-side and/or B-side cellular systems. However, different embodiments could operate at other frequencies such as 1900 MHz for the PCS-1900 cellular communication system.

A cellsite base station 68 manages calls within cell 34 of cellular network 22 and is involved in the call with cellular radiotelephone 24 on bidirectional channel 32 (FIG. 1). Bidirectional channel 32 has forward and reverse directions (discussed below). The forward and reverse directions of bidirectional channel 32 are being transmitted between cellular radiotelephone 24 and a cellsite base station antenna 70 at cellsite base station 68.

When geographical location computer 20 (FIG. 1) transmits the call locate instruction over command link 50, the instruction is obtained by dual channel receiver controllers 62 at selected cellsites 52. Each of dual channel receiver controllers 62 tunes each of dual channel receivers 56, 58, 60, and 61 to detect forward and reverse directions (discussed below) of bidirectional channel 32 through dual channel receiver antennas 84. Alternatively, forward and reverse directions of bidirectional channel 32 may be detected through base station 68 and subsequently conveyed through a cellsite data link 86 to dual channel receiver controller 62 located at cellsite 30.

Figure 3:
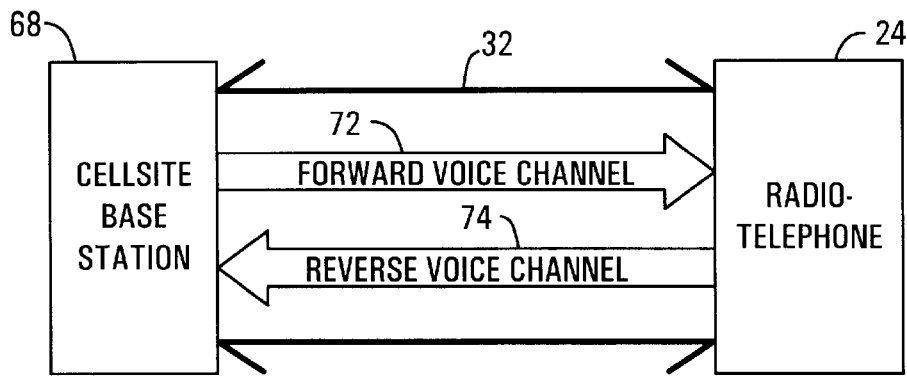
FIG. 3 shows a diagram of a bidirectional channel providing radio communication between a cellsite base station and a cellular radiotelephone.

FIG. 3 shows a diagram of bidirectional channel 32 (FIG. 1) providing radio communication between cellsite base station 68 (FIG. 2) and cellular radiotelephone 24. A bidirectional control channel (not shown) is made up of a forward control channel (not shown) and a reverse control channel (not shown) which are used to set up calls and manage cellular radiotelephones 24 in cellular network 22 (FIG. 1). Subscriber conversation signals are carried by bidirectional channel 32 in a forward direction over a forward voice channel 72. Forward voice channel 72 is transmitted from cellsite base station 68 to cellular radiotelephone 24. A reverse direction, or reverse voice channel 74, is transmitted from cellular radiotelephone 24 to cellsite base station 68. Subscriber conversation signals can take the form of voice conversation, fax transmissions, computer data transfer, silence, and the like.

Figure 4:
FIG. 4 shows a data format illustration of forward subscriber conversation signals being transmitted concurrently with a Supervisory Audio Tone (SAT) on a forward voice channel.
Figure 5:
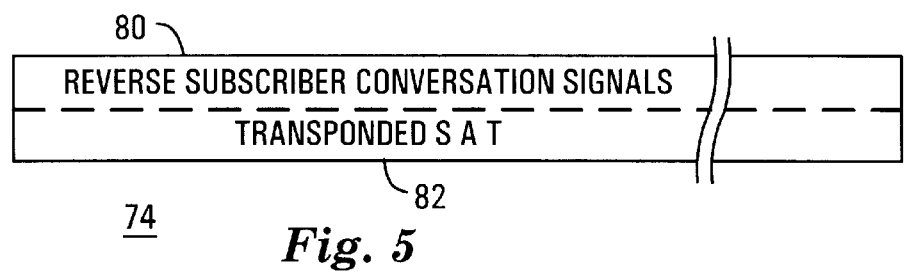
FIG. 5 shows a data format diagram depicting a transponded Supervisory Audio Tone (SAT) being transmitted concurrently with subscriber conversation signals.

FIG. 4 shows a data format illustration of forward subscriber conversation signals 76 conveyed concurrently with a Supervisory Audio Tone (SAT) 78 on forward voice channel 72. Likewise, FIG. 5 shows a data format illustration of reverse subscriber conversation signals 80 conveyed concurrently with a transponded Supervisory Audio Tone (SAT) 82 on reverse voice channel 74. In a conventional AMPS system, SAT is one of three frequencies in the 6 KHz region added to each voice channel that is transmitted by a cellsite base station and transponded by a cellular radiotelephone. One SAT frequency, either 5970, 6000, or 6030 Hz, is added to each forward voice channel in a cell by the cellsite base station controlling the cell. The selected SAT frequencies are so close together that a single phase-locked tracking filter in a cellular radiotelephone can lock to any SAT. The conventional function of a SAT is to maintain a closed identification loop for a cellsite base station. If a cellular radiotelephone does not transpond the SAT within five seconds, the cellsite base station will terminate the call. Changes in status (on or off) of the SAT and of a 10 KHz signal tone (not shown) are also used by the cellular radiotelephones to signal the occurrence of various events during the progress of a call, and to acknowledge commands sent from the cellsite base station. The phase difference between forward and reverse SAT signals can also be used to determine if the cellular radiotelephone should be handed off to an adjacent cellsite base station.

In the preferred embodiment, cellular radiotelephone 24 (FIG. 1) detects, filters, and modulates SAT 78 (FIG. 4) to convey transponded SAT 82 (FIG. 5) on reverse voice channel 74, concurrently with reverse subscriber conversation signals 80 and above the voice spectral baseband. In accordance with the preferred embodiment of the present invention, phase differences between a forward location signal SAT 78, and a reverse location signal transponded SAT 82, are used to determine probable locations of cellular radiotelephones. Since SAT 78 is conveyed throughout the conversation, even after cell-to-cell handovers, probable location measurements can be made at any time throughout the conversation and repeated measurements can be made as desired. In addition, since SAT 78 and transponded SAT 82 are carried over the voice channels as routine parts of the normal call procedure, no new mechanisms or changes are needed within cellular radiotelephone 24 for implementing the call location process.

Figure 6:
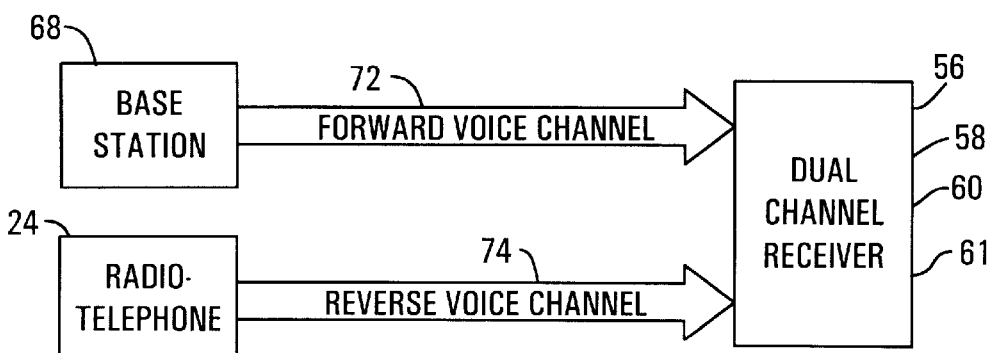
FIG. 6 shows a diagram of forward and reverse voice channels being received by a dual-channel receiver.

FIG. 6 shows a diagram of forward and reverse voice channels 72 and 74 being received by a dual channel receiver 56, 58, 60 or 61 (FIG. 2). Once dual channel receivers 56, 58, 60 and 61 are tuned by dual channel receiver controllers 62 (FIG. 2), receivers 56, 58, 60 and 61 receive SAT 78 over forward voice channel 72 of bidirectional channel 32 from cellsite base station 68 (FIG. 2). Additionally, receivers 56, 58, 60, and 61 (FIG. 4) receive transponded SAT 82 (FIG. 5) over reverse voice channel 74 of bidirectional channel 32 from cellular radiotelephone 24.

Referring momentarily to FIG. 2, forward voice channel 72 conveying SAT 78 and reverse voice channel 74 conveying transponded SAT 82 are detected by dual channel receiver antennas 84. SAT 78 is transmitted over bidirectional channel 32 by cellsite base station antenna 70 at cellsite 30. Likewise, transponded SAT 82 is being received over bidirectional channel 32 by cellsite base station antenna 70. In the preferred embodiment, dual channel receiver 61 is tuned to directly detect forward voice channel 72 conveying SAT 78 and reverse voice channel 78 conveying transponded SAT 82. Alternatively, since SAT 78 and transponded SAT 82 are being transmitted and received at cellsite base station 68 over bidirectional channel 32, SAT 78 and transponded SAT 82 may be conveyed to dual channel receiver controller 62 located at cellsite 30 by cellsite data link 86 for subsequent phase difference measurements (discussed below). Cellsite data link 86 may be a conventional wire line linking cellsite base station 68 and dual frequency receiver controller 62. By locating dual channel receiver 61 near cellsite base station 68 and configuring receiver 61 to receive SAT 78 and transponded SAT 82, link 86 may not be required which minimizes changes to pre-existing cellsite base station hardware.

Figure 7:
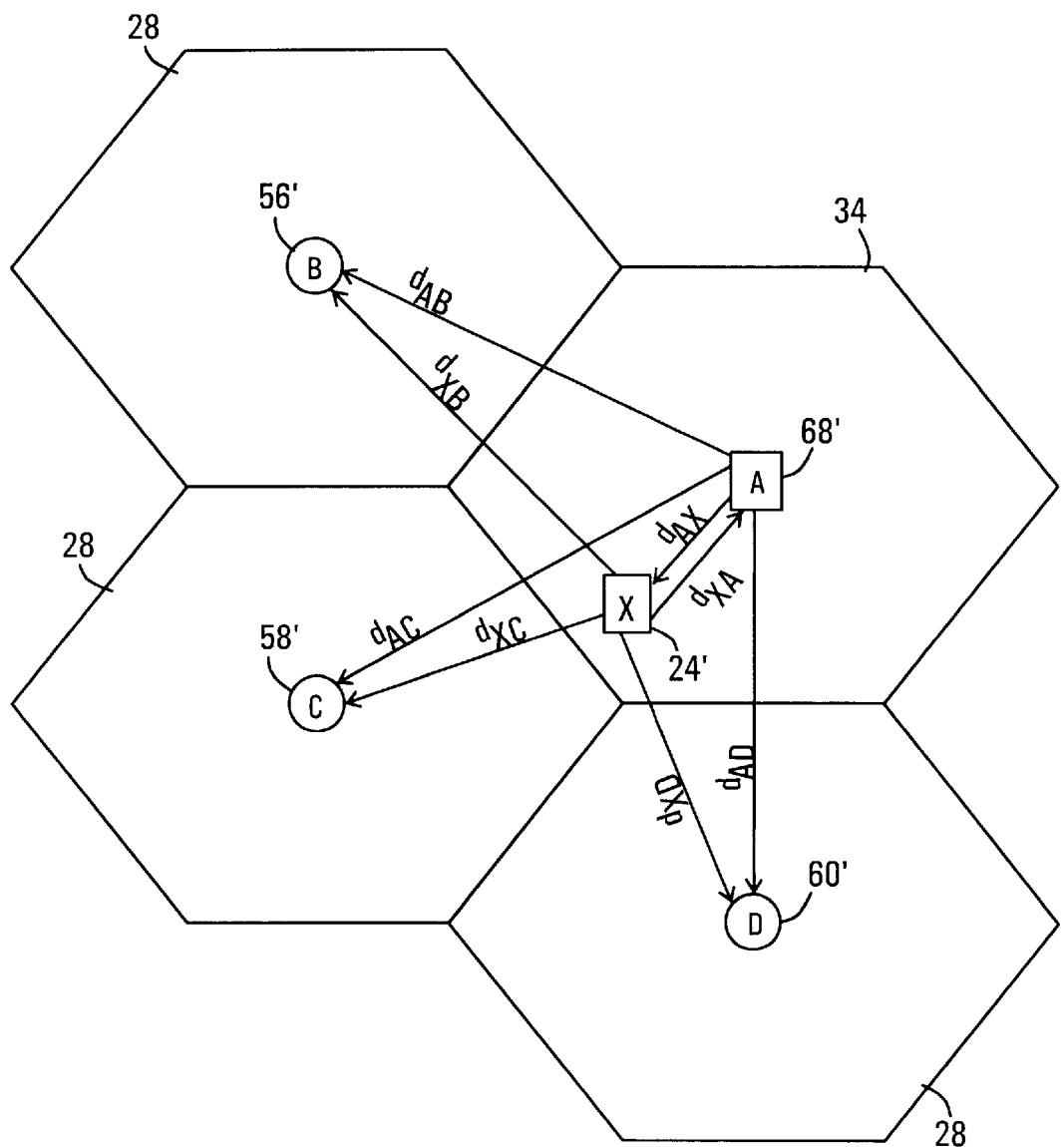
FIG. 7 shows distance relationships of the transmission paths taken by forward and reverse voice channels of a bidirectional channel.

FIG. 7 shows distance relationships of the transmission paths taken by forward and reverse voice channels 72 and 74 (FIG. 3), respectively, of bidirectional channel 32 (FIG. 1). A location 68' refers to the location of cellsite base station antenna 70 at cellsite base station 68 and a location 24' refers to the location of cellular radiotelephone 24 inside cell 34. Likewise, a location 56' refers to the location of dual channel receiver antenna 84 at dual channel receiver 56, a location 58' refers to the location of dual channel receiver antenna 84 at dual channel receiver 58, and a location 60' refers to the location of dual channel receiver antenna 84 at dual channel receiver 60. Locations 56', 58', 60', and 68' may be accurately determined in latitude and longitude coordinates by any convenient technique such as by using a Global Positioning System (GPS) receiver (not shown). These locations are then stored in a location coordinates table (not shown) in geographical location computer 20. A coordinate transformation is then used to express each dual channel receiver antenna location, 56', 58', and 60' in a coordinate system centered on cellsite base station antenna location 68'. If $\theta_0$ and $\phi_0$ are the latitude and longitude of cellsite base station antenna location 68', and $\theta_i$ and $\phi_i$ are the latitude and longitude of the ith dual channel receiver antenna locations, then (assuming the coverage region for selected cellsites 52 is small enough for earth curvature to be neglected) the coordinates of the dual channel receiver antenna in a cellsite base station-centered coordinate system are $x_i=\theta_i-\theta_0$ and $y_i=\phi_i-\phi_0$.

The distance relationship of transmission paths is related in terms of an interpath time delay. The interpath time delay is the difference in time of the arrival of SAT 78 received at a dual channel receiver and the arrival of transponded SAT 82 at the same dual channel receiver. This interpath time delay is expressed in terms of phase differences. Interpath time delay has a propagation time component along the transmission paths taken by forward and reverse voice channels 72 and 74, and a transpond turnaround time component. The transpond turnaround time is an unknown amount of time required by cellular radiotelephone 24 to transpond SAT 78 to produce transponded SAT 82.

The interpath time delay between the arrival of SAT 78 (FIG. 4) at location 56' from location 68' and transponded SAT 82 (FIG. 5) at location 56' from location 24' is:

$$\Delta t_1 = \tau_{AX} + \tau_{XB} + \tau_{transpond} - \tau_{AB} \tag{1}$$

where $\tau_{AX}$, $\tau_{XB}$, and $\tau_{AB}$ are the propagation times along paths $d_{AX}$, $d_{XB}$, and $d_{AB}$, respectively, and $\tau_{transpond}$ is SAT 78 transpond turnaround time within cellular radiotelephone 24.

The interpath time delay between the arrival of SAT 78 at location 58' from location 68' and transponded SAT 82 at location 58' from location 24' is:

$$\Delta t_2 = \tau_{AX} + \tau_{XC} + \tau_{transpond} - \tau_{AC} \tag{2}$$

where $\tau_{AX}$, $\tau_{XC}$, and $\tau_{AC}$ are the propagation times along paths $d_{AX}$, $d_{XC}$, and $d_{AC}$, respectively, and $\tau_{transpond}$ is SAT 78 transpond turnaround time within cellular radiotelephone 24.

The interpath time delay between the arrival of SAT 78 at location 60' from location 68' and transponded SAT 82 at location 60' from location 24' is:

$$\Delta t_3 = \tau_{AX} + \tau_{XD} + \tau_{transpond} - \tau_{AD} \tag{3}$$

where $\tau_{AX}$, $\tau_{XD}$, and $\tau_{AD}$ are the propagation times along paths $d_{AX}$, $d_{XD}$, and $d_{AD}$, respectively, and $\tau_{transpond}$ is SAT 78 transpond turnaround time within cellular radiotelephone 24.

The interpath time delay between the transmission of SAT 78 from location 68' and the reception of transponded SAT 82 at location 68' is:

$$\Delta t_4 = 2\tau_{AX} + \tau_{transpond} \quad (4)$$

The interpath time delay equations (1), (2), (3), and (4) may be expressed in terms of the distances between sites as:

$$d_{AX} + d_{XB} = d_{AB} + c(\Delta t_1 - \tau_{transpond}) \quad (5)$$

$$d_{AX} + d_{XC} = d_{AC} + c(\Delta t_2 - \tau_{transpond}) \quad (6)$$

$$d_{AX} + d_{XD} = d_{AD} + c(\Delta t_3 - \tau_{transpond}) \quad (7)$$

$$2d_{AX} = c(\Delta t_4 - \tau_{transpond}) \quad (8)$$

where c is the speed of propagation. Now subtracting equation (8) from equations (5), (6), and (7) yields:

$$d_{BX} - d_{AX} = d_{AB} + c(\Delta t_1 - \Delta t_4) \quad (9)$$

$$d_{CX} - d_{AX} = d_{AC} + c(\Delta t_2 - \Delta t_4) \quad (10)$$

$$d_{DX} - d_{AX} = d_{AD} + c(\Delta t_3 - \Delta t_4) \quad (11)$$

The interpath time delay equations (1), (2), (3), and (4) are all determined from measured phase differences between SAT 78 and transponded SAT 82 at each of selected cellsites 52 as:

$$\Delta t_1 = \frac{1}{2\pi f_{SAT}}(\phi_{AXB} - \phi_{AB}) \quad (12)$$

$$\Delta t_2 = \frac{1}{2\pi f_{SAT}}(\phi_{AXC} - \phi_{AC}) \quad (13)$$

$$\Delta t_3 = \frac{1}{2\pi f_{SAT}}(\phi_{AXD} - \phi_{AD}) \quad (14)$$

$$\Delta t_4 = \frac{1}{2\pi f_{SAT}}(\phi_{AXA} - \phi_0) \quad (15)$$

where, $f_{SAT}$ is a baseband frequency for SAT 78. $\phi_{AXB}$ is the phase of transponded SAT 82 demodulated and received at location 56' via path A-X-B; $\phi_{AB}$ is the phase of SAT 78 demodulated and received at location 56' via path A-B; and $\phi_{AXC}$, $\phi_{AC}$, $\phi_{AXD}$, $\phi_{AD}$, and $\phi_{AXA}$ are defined similarly. $\phi_0$ is the phase of SAT 78 transmitted from cellsite base station 68 at location 68'. Timing parameters including measured phase differences and $f_{SAT}$ are obtained at geographical computer 20 (FIG. 1) for subsequent calculations.

By taking differences to form equations (9), (10), and (11), the unknown transpond turnaround time $\tau_{transpond}$ for SAT 78 drops out of the resulting equations. Phase shifts within cellular radiotelephone 24, such as due to initial frequency error in the SAT detection phase-locked tracking filter will cancel out in forming the time differences ($\Delta t_1 - \Delta t_4$), ($\Delta t_2 - \Delta t_4$), and ($\Delta t_3 - \Delta t_4$). Additionally, all quantities on the right sides of equations (9), (10), and (11) are known or obtained directly from measurements. Therefore, if the right hand sides of equations (9), (10), and (11) are defined as:

$$p_1 \triangleq d_{AB} + c(\Delta t_1 - \Delta t_4) \quad (16)$$

$$p_2 \triangleq d_{AC} + c(\Delta t_2 - \Delta t_4) \quad (17)$$

$$p_3 \triangleq d_{AD} + c(\Delta t_3 - \Delta t_4) \quad (18)$$

then equations (9), (10), and (11) become the vector equations of hyperbolas passing through the location 24' for cellular radiotelephone 24:

$$d_{BX}(\bar{B},\bar{X}) - d_{AX}(\bar{A},\bar{X}) = p_1 \quad (19)$$

$$d_{CX}(\bar{C},\bar{X}) - d_{AX}(\bar{A},\bar{X}) = p_2 \quad (20)$$

$$d_{BX}(\bar{D},\bar{X}) - d_{AX}(\bar{A},\bar{X}) = p_3 \quad (21)$$

Cellular radiotelephone 24 engaged in an emergency call involving cellsite base station 68 is located proximate to one of the intersections of the three hyperbolas defined in vector equations (19), (20), and (21).

As discussed above, equations (19), (20), and (21) are vector equations for the hyperbolic lines of position (LOP). In an arbitrary Cartesian coordinate system within cellular network 22, coordinates of cellsite base station location 68', dual channel receiver locations 56', 58', and 60', and cellular radiotelephone location 24' can be defined as $A=(x_A, y_A)$, $B=(x_B, y_B)$, $C=(x_C, y_C)$, $D=(x_D, y_D)$, and $X=(x,y)$. Equation (19) may then be written as:

$$\sqrt{(x_B - x)^2 + (y_B - y)^2} - \sqrt{(x_A - x)^2 + (y_A - y)^2} = p_1 \quad (22)$$

Equation (22) can then be rearranged, squared and expanded into the form:

$$(x_B - x)^2 + (y_B - y)^2 = $$
$$p_1^2 + 2p_1\sqrt{(x_A - x)^2 + (y_A - y^2)} + (x_A - x)^2 + (y_A - y)^2$$

which may be further expanded and rearranged to yield:

$$(x_B^2 + y_B^2 - x_A^2 - y_A^2 - p_1^2) + 2(x_A - x_B)x + 2(y_A - y_B)y = \quad (23)$$
$$2p_1\sqrt{(x_A - x)^2 + (y_A - y)^2}$$

Define:

$$K_0 \triangleq (x_B^2 + y_B^2 - x_A^2 - y_A^2 - p_1^2)/2p_1 \quad (24a)$$

$$K_x \triangleq (x_A - x_B)/p_1 \quad (24b)$$

$$K_y \triangleq (y_A - y_B)/p_1 \quad (24c)$$

Then equation (23) may be written as:

$$K_0 + K_x x + K_y y = \sqrt{(x_A - x)^2 + (y_A - y)^2}$$

This may be squared, expanded, and rearranged to yield:

$$(K_x^2-1)x^2+(K_y^2-1)y^2+2(K_0K_x+x_A)x+2(K_0K_y+y_A)y+2K_xK_yxy+(K_0^2-x_A^2-y_A^2)=0 \quad (25)$$

Define:

$$L \triangleq K_x^2 - 1 \quad (26a)$$

$$M \triangleq 2K_xK_y \quad (26b)$$

$$N \triangleq K_y^2 - 1 \quad (26c)$$

$$P \triangleq 2(K_0K_y + x_A) \quad (26d)$$

$$Q \triangleq 2(K_0K_x + y_A) \quad (26e)$$

$$R \triangleq K_0^2 - x_A^2 - y_A^2 \quad (26f)$$

Then equation (25) can be written as the double quadratic equation representing a hyperbola:

$$Lx^2+Mxy+Ny^2+Px+Qy+R=0 \quad (27)$$

If the origin of coordinates is taken at location 68', cellsite base station 68, then $x_A=0$, $y_A=0$. Using the equations (24), equations (26) become:

$$L=(x_B^2-p_1^2)/p_1^2 \quad (28a)$$

$$M=2x_By_B/p_1^2 \quad (28b)$$

$$N=(y_B^2-p_1^2)/p_1^2 \quad (28c)$$

$$P=-x_B(x_B^2+y_B^2-p_1^2)/p_1^2 \quad (28d)$$

$$Q=-y_B(x_B^2+y_B^2-p_1^2)/p_1^2 \quad (28e)$$

$$R=(x_B^2+y_B^2-p_1^2)^2/4p_1^2 \quad (28f)$$

Since equation (27) represents a hyperbola, then:

$$M^2-4LN<0 \quad (29)$$

Inserting equations (28a), (28b), and (28c) into equation (29) and simplifying yields:

$$p_1^2<x_B^2+y_B^2 \quad (30)$$

Inserting equation (16) into equation (30) and noting that $x_B^2+y_B^2=d_{AB}^2$ yields:

$$[d_{AB}+c(\Delta t_1-\Delta t_4)]^2<d_{AB}^2 \quad (31)$$

or, using equation (9) and taking the square root, equation (31) becomes:

$$|d_{BX}-d_{AX}|<d_{AB} \quad (32)$$

Equation (32) represents a condition on the location of cellular radiotelephone 24 to assure that a hyperbolic curve will be formed using measurements from locations 68' and 56'. Equation (32) will always be true except when location 24' of cellular radiotelephone 24 is on the straight-line path joining locations 68' and 56', and beyond either location 68' or location 56'. When those conditions hold, equations (29) and (32) are replaced by equalities, and equations (25), (19), and (9) then represent a parabolic curve. However, the geographical location process works for a parabolic curve as well as a hyperbolic curve.

A hyperbolic curve through location 24' of cellular radiotelephone 24 is generated at geographical location computer 20 (FIG. 1) for each of dual channel receivers 56, 58, and 60. The hyperbolic curves are in the form of equation (27). These equations, which represent a set of intersecting hyperbolas (and, in rare cases, parabolas) are written as:

$$L_1x^2+M_1xy+N_1y^2+P_1x+Q_1y+R_1=0$$

$$L_2x^2+M_2xy+N_2y^2+P_2x+Q_2y+R_2=0$$

$$L_3x^2+M_3xy+N_3y^2+P_3x+Q_3y+R_3=0 \ldots$$

$$L_nx^2+M_nxy+N_ny^2+P_nx+Q_ny+R_n=0 \quad (33)$$

In practice, more than three dual channel receivers can be used to locate a cellular radiotelephone, creating an intersection of more than three hyperbolas at the probable location. With an increased number of curves, there is a greater likelihood that one pair of curves will intersect at nearly right angles, eliminating the possibility of a highly elongated error ellipse in which the radiotelephone may be located. Thus, additional curves may tend to compensate for the uncertainties of one another and improve the accuracy of the geographical location process.

Another advantage of using more than three dual channel receivers arises in locating callers in dense urban areas where the transmission paths to the cellular radiotelephone may include reflections off of buildings in the area. Such a reflection can cause the apparent path length to a fixed dual channel receiver to differ from the straight-line distance between the fixed dual channel receiver and the cellular radiotelephone. This change in path length, known as multipath interference, can cause an error in the determined location of the cellular radiotelephone. However, by using multiple dual channel receivers with different path geometries, errors in the multiple intersections of the curves at the radiotelephone location will tend to be mitigated reducing the deleterious effects and improving the location estimate.

The number of dual channel receivers available for radiotelephone location can be increased in cellular calling areas by cooperation of the AMPS A-side and B-side system carriers in cellular networks. In some areas, the cells of the A-side and B-side systems overlap, although their cellsites are in different locations. Differing cellsite locations provide readily available geometric diversity and increase the potential number of measurements. By sharing geographical location systems the accuracy of locating a cellular radiotelephone may be increased. This cooperation could be accomplished by both A-side and B-side cellular systems sharing the use of geographical location computer 20. Geographical location computer 20 would then select dual channel receivers to locate the cellular radiotelephone at cellsites located closest to the cell from where the call originates regardless of A-side or B-side preferences.

The number of equations (33) is dependent upon the number of dual channel receivers used in the call location process. The solution of equations (33) is found by taking the equations two at a time. With n equations (where n represents the number of dual channel receivers utilized to locate cellular radiotelephone 24 there will be $n(n-1)/2$ pairs of equations to solve. This may make the use of more than four dual channel receivers impractical for determining location 24' of cellular radiotelephone 24 in a reasonable response time.

A first step in the preferred embodiment is to plot out the contours of each hyperbolic curve, since hyperbolic curves generally exhibit a variety of positions and orientations. Generating the plots is performed by geographical location computer 20 (FIG. 1) utilizing known techniques. Plots may be represented in a manner that is convenient to subsequent calculations such as mathematically or graphically. Once this is done, initial approximations for the locations of the intersections of each pair of equations can be found.

Figure 8:
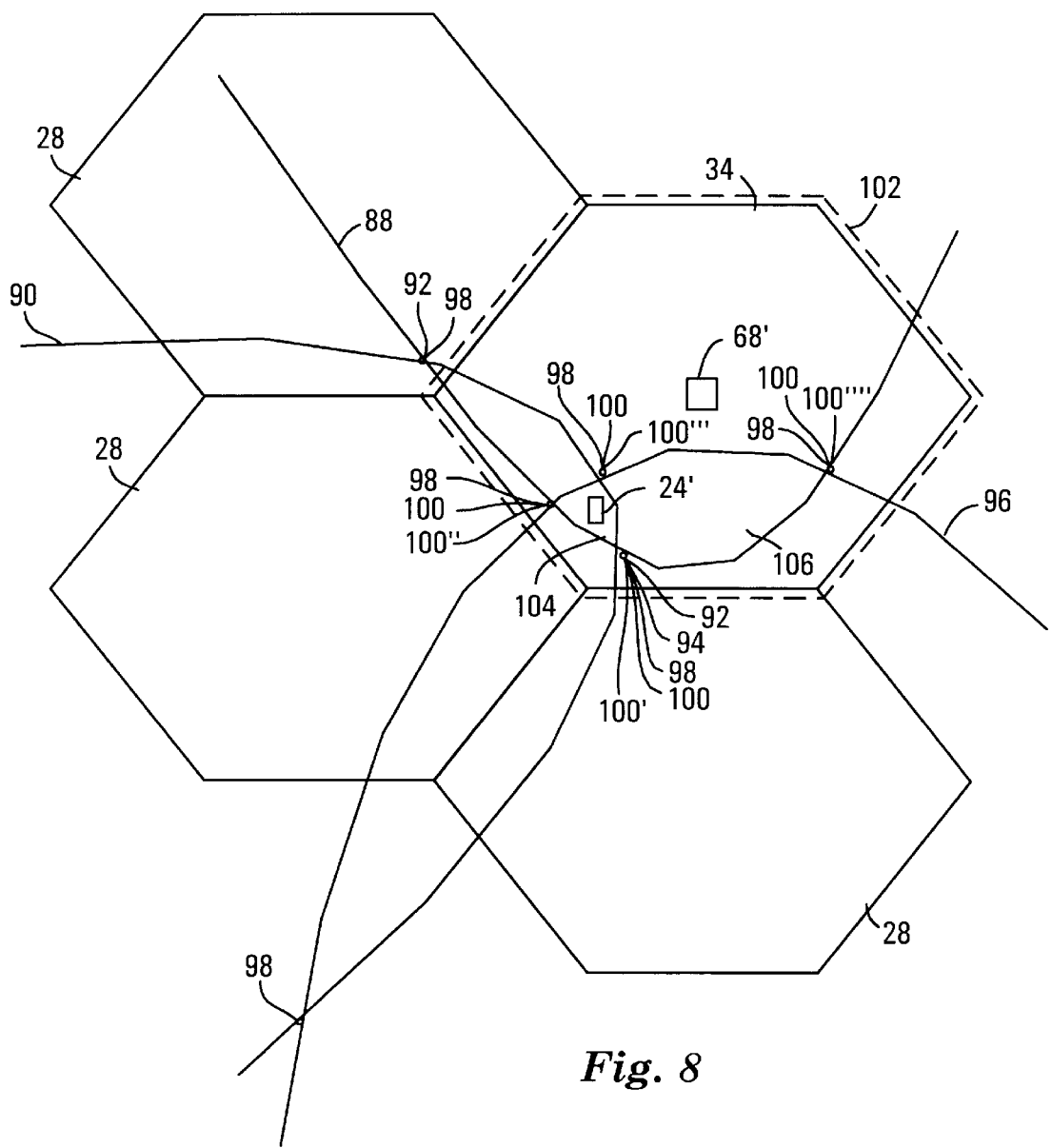
FIG. 8 shows a diagram of three hypothetical intersecting hyperbolic curves generated in response to interpath time delays.

FIG. 8 shows a diagram of three hypothetical intersecting hyperbolic curves generated in response to the interpath time delays, $\Delta t_1$, $\Delta t_2$, $\Delta t_3$, and $\Delta t_4$. In general, two hyperbolic curves may intersect in up to four distinct intersection points, creating an ambiguity as to which point is the true location of cellular radiotelephone 24. In many situations, the natural ambiguities due to multiple intersections of the two hyperbolic curves may occur outside the coverage region of the cellsite transmit antenna that is handling the call, i.e. outside the cell containing the caller. Referring to FIG. 8, a first hyperbola 88 generated in response to interpath time delays for dual channel receiver 56 and a second hyperbola 90 generated in response to interpath time delays for dual channel receiver 58 have two intersection points 92, however, only one valid intersection point 94 is located within cell 34 (FIG. 1). In the instance where only one intersection point for the two hyperbolas is positioned within cell 34, that intersection may be selected as a probable location for cellular radiotelephone 24.

When there are two or more intersection points located within cell 34, determination of the probable location of cellular radiotelephone 24 is made by the use of a third hyperbola 96 generated similarly to first and second hyperbolas 88 and 90.

Third hyperbola 96 intersects first and second hyperbolas 88 and 90 to form up to twelve distinct intersection points 98. Ideally all three hyperbolas will simultaneously intersect at only one intersection point, however due to noise such as multipath interference, phase digitization error, and the like, the noise may cause each hyperbola to fail to pass directly through location 24' of cellular radiotelephone 24 (FIG. 1) with varying amounts of error in each of hyperbolas 88, 90, and 96. Nevertheless, it is logical to assume that as long as the measurement noise is not too great, hyperbolas 88, 90, and 96 pass in the vicinity of location 24', and that location 24' is close to that point at which the sum of the shortest distances to hyperbolas 88, 90, and 96 is a minimum. In other words, location 24' is located near the center of the area defined by the three intersection points of hyperbolas 88, 90, and 96.

Once the contours of hyperbolas 88, 90, and 96 are plotted and intersection points 98 are determined, valid intersection points 100 are identified. Valid intersection points 100 are those intersection points 98 that fall within a maximum search range 102. Maximum search range 102 is centered at cellsite base station antenna location 68' and defines the area that will be evaluated when locating cellular radiotelephone 24'. In the preferred embodiment, maximum search range 102 is illustrated as equivalent to the area of cell 34, however, nothing in the present invention limits maximum search range 102 to this size or shape. It may be desired to search over a greater area in case cellular radiotelephone 24 is moving or is near the edge of cell 34. As illustrated in FIG. 8, there may be clusters of valid intersection points 100 for each pair of hyperbolas. Assuming that there is more than one candidate cluster of intersections, the probable location is at the center of the cluster defined by the smallest area.

A first cluster area 104, defined by a set of valid intersection points 100', 100", and 100''', and a second cluster area 106, defined by another set of valid intersection points 100', 100''', and 100'''' are each formed by three pairs of valid intersection points 100 for each of hyperbolas 88, 90, and 96. First cluster area 104, defined by the set of valid intersection points 100', 100", and 100''', is identified as encompassing a minimum area therefore, first cluster area 104 is the most likely area in which location 24' for radiotelephone 24 is located. Those skilled in the art will recognize the number of valid intersection points that define a cluster area is dependent upon the number of hyperbolas that are plotted to determine the probable location of a cellular radiotelephone.

To solve for the probable location of cellular radiotelephone 24, each point in the set of valid intersection points 100", 100', and 100''' of cluster area 104 must first be accurately located. To accurately locate valid intersection points 100", 100', and 100''' a starting point for a Newton-Raphson curve fitting process is selected using an initial guess algorithm. The initial guess algorithm determines the x and y coordinates for the starting point, or initial guess, of the location of cellular radiotelephone 24. The initial guess is the nearest valid intersection point 100 that has the smallest sum of squared distances to the nearest neighboring valid intersection points 100 involving different pairs of hyperbolic curves. In the preferred embodiment, the x and y coordinates for the starting point become the initial guess for using a Newton-Raphson curve fitting process. It is desirable to have a good initial guess for each of the valid intersection points because a poor choice may cause the Newton-Raphson process to diverge or converge to a different point, creating error in the location process.

The Newton-Raphson curve fitting process is known to those skilled in the art. It is an iterative refinement process used to solve nonlinear pairs of equations. In the preferred embodiment, the Newton-Raphson process solves pairs of nonlinear equations (33) to find accurate locations for each valid intersection point 100", 100', and 100'''. The starting point is input into the Newton-Raphson process to solve the hyperbolic equations (33) for hyperbolic curves 88 and 90 to obtain a more accurate location of valid intersection point 100'. Likewise, the accurate location of valid intersection point 100" is determined by performing the Newton-Raphson technique and using the starting point to solve the hyperbolic equations (33) for hyperbolic curves 88 and 96. Finally, the accurate location of valid intersection point 100''' is determined by performing the Newton-Raphson technique and using the starting point to solve the hyperbolic equations (33) for hyperbolic curves 90 and 96.

After the accurate locations of valid intersection points 100", 100', and 100''' are found, the final estimate of the probable location of cellular radiotelephone 24 is taken as the centroid of valid intersection points 100", 100', and 100''' within first cluster area 104 and will be discussed in connection with a flowchart illustrated in FIG. 12.

Figure 9:
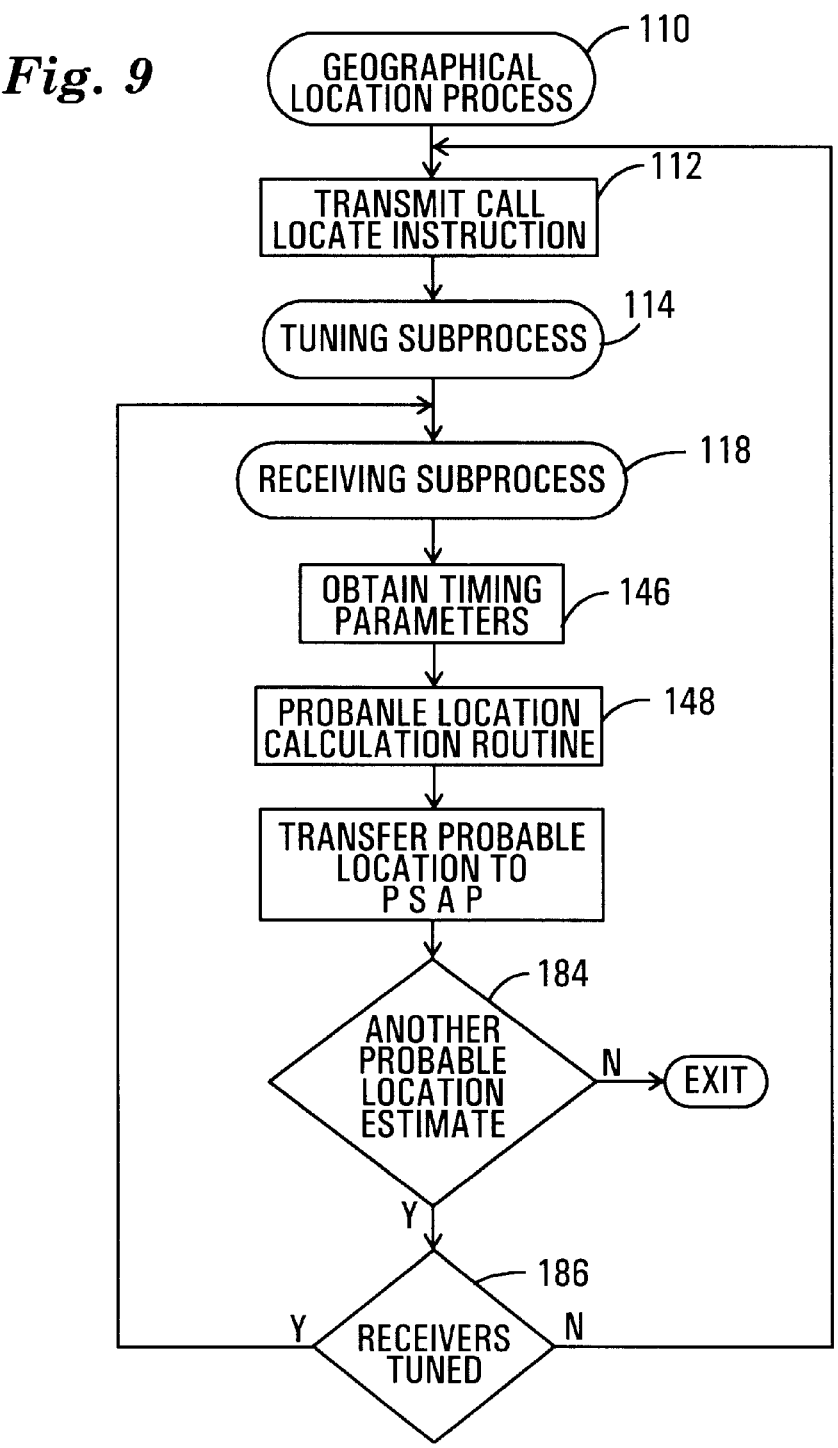
FIG. 9 shows a flowchart of a geographical location process performed to locate a cellular radiotelephone engaged in a call.

FIG. 9 shows a flowchart of a geographical location process 110 performed to locate cellular radiotelephone 24 (FIG. 1) within cellular network 22 (FIG. 1) engaged in a call. Cellular network 22 is an advanced mobile phone service (AMPS) network having either or both A-side and B-side cellular systems and the call may be detected over either one of the A-side or B-side systems. The call, involving cellsite base station 68 (FIG. 2), is conducted over bidirectional channel 32 (FIG. 1). Bidirectional channel 32 has a forward direction or forward voice channel 72 (FIG. 3) and a reverse direction or reverse voice channel 74 (FIG. 3). Forward voice channel 72 conveys subscriber conversation signals concurrent with SAT 78 (FIG. 4) while reverse voice channel 74 conveys subscriber conversation signals concurrent with transponded SAT 82 (FIG. 5). In the preferred embodiment of the present invention, SAT 78 serves as a forward location signal transmitted during the call over the forward direction of bidirectional channel 32. Transponded SAT 82 serves as a reverse location signal in a similar manner.

Location process 110 is initiated when geographical location computer 20 (FIG. 1) obtains notice 46 (FIG. 1) of the call from MTSO 36 (FIG. 1). Notice 46 conveys channel code (CHANNEL) 47 identifying bidirectional channel 32 over which the call is being conducted and cell identification code (CELL ID) 48 (FIG. 1) identifying cellsite base station 68 (FIG. 2). Geographical location computer 20 is activated upon receipt of notice 46 to begin location process 110.

Process 110 begins with a task 112 which transmits a call locate instruction over command link 50 (FIG. 1). The call locate instruction, transmitted from geographical location computer 20 to the selected dual channel receiver controllers 62 (FIG. 2) identifies bidirectional channel 32. Following transmission of a call locate instruction, location process 110 proceeds to a tuning subprocess 114 which is performed at controllers 62.

Figure 10:
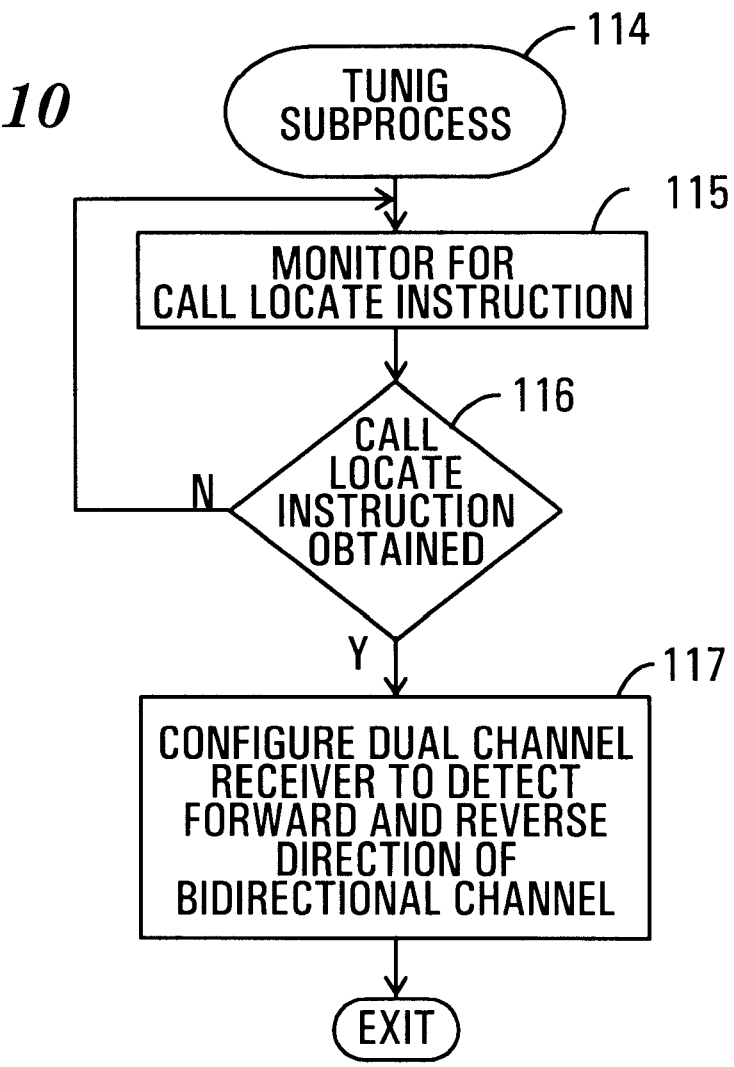
FIG. 10 shows a flowchart of a tuning subprocess performed by dual channel receiver controllers.

FIG. 10 shows a flowchart of tuning subprocess 114 performed by each of dual channel receiver controllers 62

(FIG. 2). Tuning process 114 begins with a task 115 which causes dual channel receiver controllers 62 at all cellsites 26 (FIG. 1) to monitor for a call locate instruction.

In response to monitoring task 115, a query task 116 determines if a call locate instruction is obtained. When query task 116 does not detect a call locate instruction, subprocess 114 loops back to task 115 to continue monitoring for call locate instructions. When query task 116 determines that a call locate instruction is obtained over command link 50 (FIG. 1) at selected cellsites 52, subprocess 114 proceeds with a task 117.

Task 117 configures dual channel receivers 56, 58, 60, and 61 (FIG. 2) to detect forward voice channel 72 and reverse voice channel 78 of bidirectional channel 32 (FIG. 1). Receivers 56, 58, 60, and 61 are tuned to a corresponding pair of transmitter frequencies defined by AMPS. Dual channel receiver controllers 62 enable geographical location computer 20 to be in data communication with each of dual channel receivers 56, 58, 60, and 61 such that each of receivers 56, 58, 60, and 61 are tuned to receive SAT 78 over forward voice channel 72 (FIG. 3) and transponded SAT 82 over reverse voice channel 74 (FIG. 3) of bidirectional channel 32.

Following task 117, subprocess 114 transfers program control to a receiving subprocess 118 of location process 110, as shown in FIG. 9. Subprocess 118 is performed concurrently at dual channel receivers 56, 58, 60, and 61 in concert with corresponding dual channel receiver controllers 62.

Figure 11:
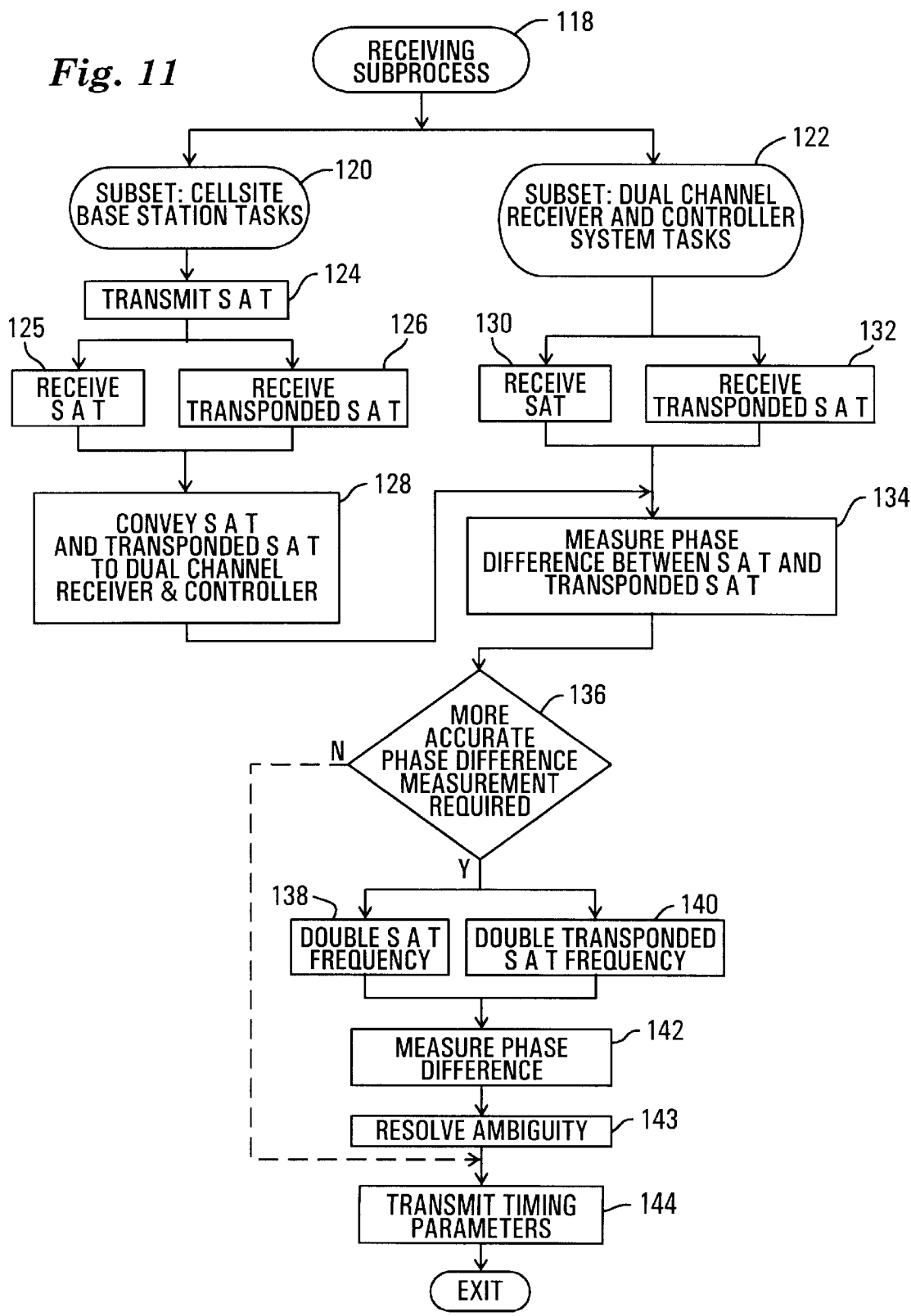
FIG. 11 shows a flowchart of a receiving subprocess performed by dual channel receivers and their associated dual channel receivers to measure the phase differences of received location signals.

FIG. 11 shows a flowchart of receiving subprocess 118 performed by each of dual channel receivers 56, 58, 60, and 61 and their associated dual channel receiver controllers 62 to measure the phase differences of received location signals associated with cellular radiotelephone 24. Receiving subprocess 118 branches with a subset 120 describing tasks specific to cellsite 30 (FIG. 1) in which base station 68 (FIG. 2) is involved in a call with cellular radiotelephone 24 and a subset 122 describing tasks specific to selected cellsites 52, other than cellsite 30, that were configured in task 117 to receive cellular radiotelephone signals.

Subset 120 begins with a task 124. During task 124, cellsite base station 68 transmits SAT 78 (FIG. 4) as part of the standard procedures for establishing and maintaining a telephone call from or to cellular radiotelephone 24 in accordance with conventional cellular telephony practices. In other words, cellsite base station 68 transmits SAT 78 during the call over forward voice channel 72 (FIG. 3) of bidirectional channel 32 concurrently with forward subscriber conversation signals 76 (FIG. 4).

In response to task 124, a task 125 receives the transmitted SAT 78 and a task 126 concurrently receives transponded SAT 82. Cellular radiotelephone 24 detects, filters and modulates SAT 78 to produce transponded SAT 82 and conveys transponded SAT 82 over reverse voice channel 74 (FIG. 3). Cellsite base station 68 receives transponded SAT 82 during the call over reverse voice channel 74 of bidirectional channel 32 concurrently with reverse subscriber conversation signals 80 (FIG. 5).

Following tasks 125 and 126, a task 128 then conveys SAT 78 and transponded SAT 82 via bus line 64 from dual channel receiver 61 to dual channel receiver controller 62, located at cellsite 30 (FIG. 2) for subsequent processing.

Dual channel receiver 61 (FIG. 2) is tuned to receive SAT 78 from cellsite base station 68 and transponded SAT 82 from cellular radiotelephone 24 over forward and reverse voice channels 72 and 74 (not shown). Accordingly, geographical location system 21 (FIG. 1) does not rely upon modification of existing cellular base stations or radiotelephone infrastructure. However, those skilled in the art will recognize that the received forward voice channel 72 may require some attenuation of signal strength due to the proximity of dual channel receiver 61 to cellsite base station 68.

In an alternative embodiment of the present invention whereby dual channel receiver 61 is not tuned to forward voice channel 72 and reverse voice channel 74, task 128 obtains SAT 78 directly from the internal circuitry of the transmitter of base station 68. Likewise, transponded SAT 82 is obtained directly from the internal circuitry of the receiver of base station 68 wherein transponded SAT 82 is routinely extracted in accordance with conventional cellular telephony practices. Dual channel receiver 61 is then not needed, and task 128 conveys SAT 78 and transponded SAT 82 directly from base station 68 via cellsite data link 86 (FIG. 2) to dual channel receiver controller 62, located at cellsite 30 (FIG. 2), for subsequent processing.

Subset 122 begins with a task 130 which receives SAT 78. Forward voice channel 72 of bidirectional channel 32 is transmitted from cellsite base station 68 and conveys SAT 78 concurrent with forward subscriber conversation signals (FIG. 4). SAT 78, employed as a forward location signal and conveyed over forward voice channel 72, is received by each of dual channel receivers 56, 58, 60, and through corresponding dual channel receiver antennas 84 (FIG. 2). SAT 78 is then received by dual channel controllers 62 over bus lines 64 (FIG. 2) for subsequent processing.

Concurrent with task 130, a task 132 receives transponded SAT 82 (FIG. 5). Reverse voice channel 74 of bidirectional channel 32 is transmitted from cellular radiotelephone 24 and conveys transponded SAT 82 concurrent with reverse subscriber conversation signals 80 (FIG. 5). Transponded SAT 82, employed as a reverse location signal and conveyed over reverse voice channel 74, is received by each of dual channel receivers 56, 58, 60 through corresponding dual channel receiver antennas 84 (FIG. 2). Transponded SAT 82 is then received by dual channel controllers 62 over bus lines 64 (FIG. 2) for subsequent processing. Those skilled in the art will recognize that tasks 125, 126, 130, and 132 are performed while SAT 78 transmission of task 124 is active.

Following task 128 or task 132, receiving subprocess 118 proceeds similarly at each of selected cellsites 52 (FIG. 1) used for locating cellular radiotelephone 24. Subprocess 118 proceeds with a task 134 which measures the phase difference between SAT 78 and transponded SAT 82 at each of dual channel receivers 56, 58, 60, and 61 to determine the interpath time delay. The interpath time delay is the difference in transmission time between SAT 78 and transponded SAT 82 and has a transpond turnaround component and a propagation component. The interpath time delays are computed from the measured phase differences and the transmitted SAT frequency using equations (12), (13), (14), and (15).

After task 134 measures a phase difference, query task 136 determines if a more accurate phase difference measurement is required. In measuring the phase differences at each location 56', 58', 60', and 68', the phase differences are desirably measured as accurately as possible. One way to do this is to double the frequency of SAT 78 and transponded SAT 82 and measure the phase difference between the doubled signals. The time uncertainty corresponding to the measured phase difference will be halved to produce a more accurate phase difference. Geographical location computer 20 may be programmed to always perform a more accurate phase difference phase measurement, in which case, subprocess 118 proceeds to a task 138. In an alternative embodiment, geographical location computer 20 may be programmed to not perform a more accurate phase difference measurement, in which case, subprocess 118 proceeds to a task 144.

If a more accurate phase difference measurement is required, subprocess 118 proceeds to a task 138. SAT 78 exhibits one of three frequencies around 6 KHz. Task 138 doubles the frequency of SAT 78 to produce a doubled frequency for SAT 78. Transponded SAT 82 also exhibits substantially the same frequency as SAT 78. Concurrent with task 138, a task 140 doubles the frequency of transponded SAT 82 to produce a doubled frequency for transponded SAT 82.

Following doubling tasks 138 and 140, a task 142 measures the phase difference between the doubled frequency for SAT 78 and the doubled frequency for transponded SAT 82. This doubled-signal phase difference measurement is then divided in half to produce a halved-signal phase difference measurement. The halved-signal phase difference corresponds to the phase difference between SAT 78 and transponded SAT 82. Subprocess 118 proceeds to a task 143.

Following task 142, task 143 resolves ambiguity that may have been introduced when the phase difference measurement was made between doubled SAT 78 and doubled transponded SAT 82. Task 143 resolves this ambiguity by selecting the halved-signal phase difference measurement that corresponds to the location of the basic undoubled signal phase difference measurement. Tasks 138, 140, 142, and 143 can be repeated between the doubled signal and a quadrupled signal, and so on to repeatedly halve the phase uncertainty. However, other factors, such as multipath interference may limit how far to go in this doubling process.

Following task 136 or 143, subprocess 118 proceeds to a task 144. Task 144 transmits timing parameters from each of dual channel receivers 56, 58, 60, and 61 through each of dual channel receiver controllers 62 to geographical location computer 20 (FIG. 1) via data link 54. Timing parameters are made up of phase difference measurements, frequency of SAT 78, and other parameters relevant to calculating an interpath time delay.

Following transmitting task 144, subprocess 118 returns program control to a task 146 of location process 110 (FIG. 9). Task 146 and subsequent tasks are performed at geographical location computer 20 (FIG. 1). Task 146 obtains timing parameters, including measured phase differences and frequency of SAT 78. Geographical location computer 20 (FIG. 1) receives timing parameters from each of dual channel receivers 56, 58, 60, and 61 through each of dual channel receiver controllers 62. In response to receipt of timing parameters in task 146, location process 110 proceeds to a probable location calculation routine 148 which calculates a probable location in response to SAT 78 and transponded SAT 82 received at each of dual channel receivers 56, 58, 60, and 61.

Figure 12:
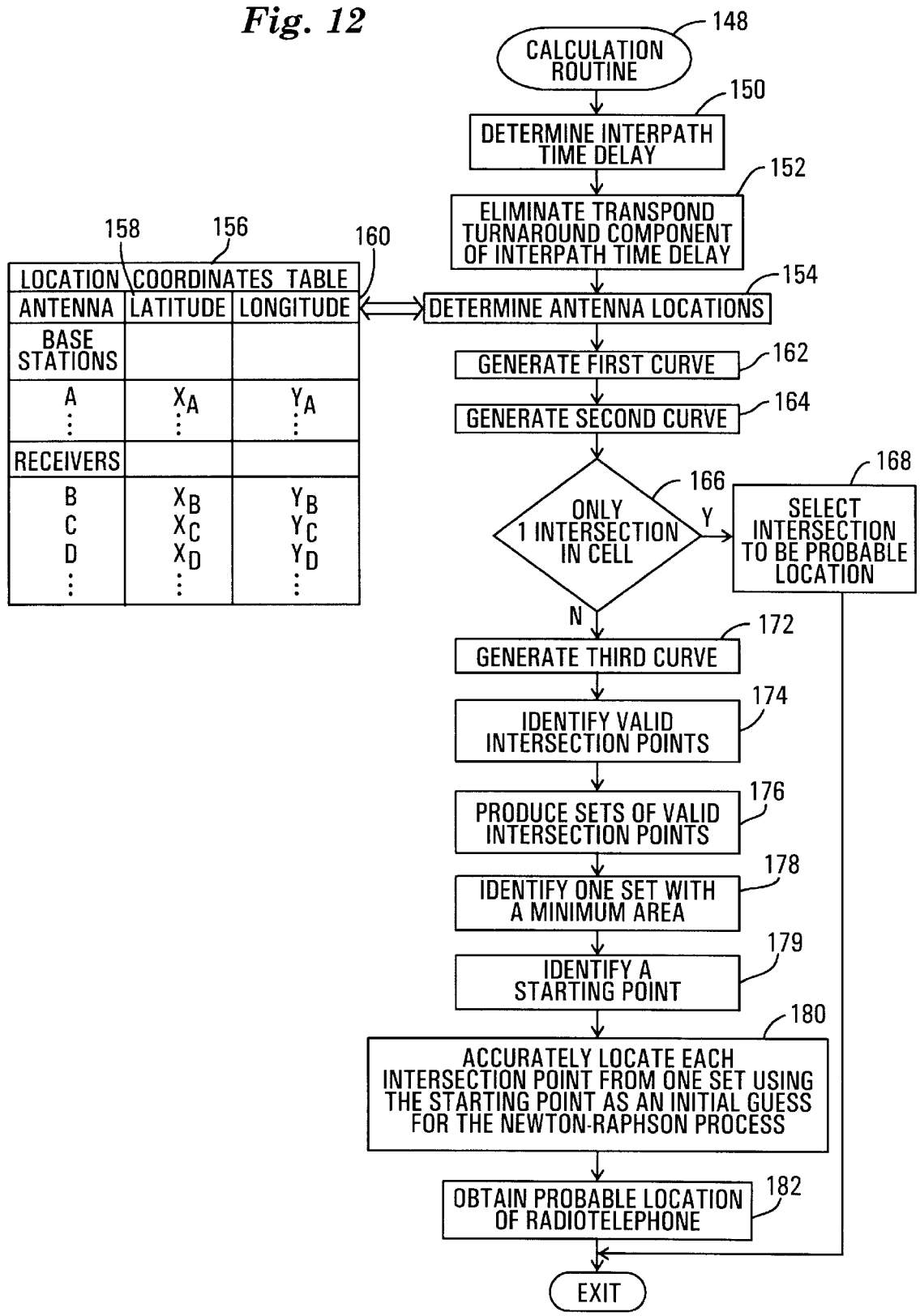
FIG. 12 shows a flowchart of a probable location calculation routine performed by a geographical location computer in response to timing parameters obtained from dual channel receiver controllers.

FIG. 12 shows a flowchart of probable location calculation routine 148 performed by geographical location computer 20 (FIG. 1) in response to timing parameters obtained from dual channel receiver controllers 62. Calculation routine 148 begins with a task 150. Task 150 determines the interpath time delay from phase differences measured at each of dual channel receivers 56, 58, 60, and 61. The measured phase difference at dual channel receiver 61 is in response to transponded SAT 82 received at cellsite base station 68 over bidirectional channel 32 (FIG. 1). Referring to equations (5), (6), (7), and (8), the interpath time delay for each of receivers 56, 58, 60, and cellsite base station 68 has a transpond turnaround component and a propagation component.

Next, a task 152 eliminates the transpond turnaround component from interpath time delays. Referring to equations (9), (10), and (11), transpond turnaround component is eliminated from interpath time delay equations for each of receivers 56, 58, and 60, by subtracting a base station interpath time delay determined for cellsite base station 68. Referring to equation (4), cellsite base station 68 receives transponded SAT 82 over bidirectional channel 32 so that a base station interpath time delay can be determined. The base station interpath time delay also has the transpond turnaround component and a propagation component. Subtracting base station interpath time delay from interpath time delay equations for each of receivers 56, 58, and 60 causes the unknown turnaround component to drop out of subsequent equations.

Following task 152, a task 154 determines locations for cellsite base station antenna 70 (FIG. 2) and dual channel receiver antennas 84 (FIG. 2) centered on cellsite base station 68 by accessing a location coordinates table 156 stored in geographical location computer 20 (FIG. 1). Location coordinates table 156 contains previously determined latitude coordinates 158 and longitude coordinates 160 for each of base stations 66 and dual channel receivers 56, 58, 60, and 61 in cellular network 22 (FIG. 1). Latitude coordinates 158 and longitude coordinates 160 for cellsite base station 68 and dual channel receivers 56, 58, 60 and 61 are transformed into a coordinate system centered on cellsite base station 68. Location 56' (FIG. 7) of dual channel receiver antenna 84 at dual channel receiver 56, location 58' (FIG. 7) of dual channel receiver antenna 84 at dual channel receiver 58, and location 60' of dual channel receiver antenna 84 at dual channel receiver 60 are the resulting transformed locations centered about location 68' (FIG. 7) of cellsite base station antenna 70 at cellsite base station 68. Locations 56', 58', 60', and 68' are used to determine transmission distances of forward and reverse directions of bidirectional channel 32. These distances are then used in the calculation of the interpath time delay equations.

Following location task 154, a task 162 generates first hyperbolic curve 88 (FIG. 8). First hyperbolic curve 88 is generated mathematically or graphically by solving the double quadratic equation (27). Hypothetically, first hyperbola 88 is a first hyperbolic curve generated from timing parameters received at location 56' of dual channel receiver 56 and location 68' cellsite base station. Cellular radiotelephone 24 (FIG. 1) resides proximate to an unknown point on first hyperbola 88.

Following task 162, a task 164 generates second hyperbolic curve 90 (FIG. 8). Second hyperbolic curve 88 is also generated mathematically or graphically by solving the double quadratic equation (27). Hypothetically, second hyperbola 90 is a second hyperbolic curve generated from timing parameters received at location 58' of dual channel receiver 58 and location 68' cellsite base station. Cellular radiotelephone 24 (FIG. 1) also resides proximate to an unknown point on second hyperbola 90. Additionally, second hyperbola 90 intersects first hyperbola 88 at up to four intersection points 92 (FIG. 8).

Following task 164, a query task 166 determines if there is only one intersection point positioned in cell 34 (FIG. 1) in which the call from cellular radiotelephone 24 originated. If geographical location computer 20 (FIG. 1) determines that there is only one intersection point positioned in cell 34, routine 148 proceeds to a task 168.

Task 168 selects the one intersection point in cell 34 as the probable location of cellular radiotelephone 24. Referring to hyperbolas 88 and 90 (FIG. 8) valid intersection point 94 is selected as the probable location of cellular radiotelephone 24. In an optional task (not shown) geographical location computer 20 may then input valid intersection point 94 as an initial guess into a Newton-Raphson curve fitting process for iterative refinement of a probable location. The Newton-Raphson process is a well known technique for solving a pair of nonlinear equations. Iteratively refining the location of valid intersection point 94 may produce a more accurate probable location for cellular radiotelephone 24. Following task 168, calculation routine 148 returns program control to a task 170 of location process 110 (FIG. 9).

In query task 166 (FIG. 12) if there is more than one intersection point in cell 34, routine 148 proceeds to a task 172. Task 172 causes geographical location computer 20 to generate third hyperbolic curve 96 (FIG. 8). Third hyperbolic curve 88 is also generated mathematically or graphically by solving the double quadratic equation (27). Hypothetically, third hyperbola 96 is a third hyperbolic curve generated from timing parameters received at location 60' of dual channel receiver 60 and location 68' cellsite base station. Cellular radiotelephone 24 (FIG. 1) also resides proximate to an unknown point on third hyperbola 96. Additionally, third hyperbola 96 intersects first hyperbola 88 and second hyperbola 90 at points 98 (FIG. 8).

Following task 172, a task 174 identifies valid intersection points 100 (FIG. 8) from intersection points 98. Three hyperbolas may intersect at up to twelve pairs of intersection points. Hyperbolas 88, 90, and 96 (FIG. 8) intersect at six pairs of intersection points 98. Geographical location computer 20 identifies valid intersection points 100 as those intersection points 98 that fall within maximum search range 102 (FIG. 8) for cell 34 (FIG. 1) centered at cellsite base station 68 (FIG. 2). Additionally, valid intersection points 100 are taken as those points where the separations between pairs of hyperbolic curves 88, 90, and 96 are less than a small number epsilon.

Following identification of valid intersection points 100 in task 174, a task 176 produces sets of valid intersection points 100. To produce sets of valid intersection points 100, the sum of the squared distances from each valid intersection point 100 to the set of all nearest remaining valid intersection points 100 are found such that all hyperbolas pass through at least one valid intersection point 100 in the set. Thus, a set of valid intersection points includes one valid intersection point 100 from the intersection of first and second hyperbolas 88 and 90, one valid intersection point 100 from the intersection of first and third hyperbolas 88 and 96, and one valid intersection point 100 from the intersection of second and third hyperbolas 90 and 96. Task 176 may cause geographical location computer 20 to generate more than one set of valid intersection points.

After sets of intersection points have been identified in task 176, a task 178 identifies one set of valid intersection points that encompasses a minimum cluster area. First cluster area 104 (FIG. 8) is defined by the set of valid intersection points 100", 100', and 100''' and is identified as encompassing a minimum area.

In response to identification task 178, a task 179 selects a starting point from the one set of valid intersection points that defines first cluster area 104. In the preferred embodiment, the location of the nearest intersection point 100' that has the smallest sum of squared distances to the nearest neighbor intersection points 100" and 100''' is selected as the starting point for iterative refinement of valid intersection points 100', 100", and 100'''. However, the starting point may not be one of valid intersection points 100', 100", or 100''', but may be another point that is responsive to the area encompassed by first cluster area 104. It will be apparent to those skilled in the art that if more than three selected cellsites 52 (FIG. 1), remote from base station 68 (FIG. 2), collect interpath time delay data, then more than three hyperbolic curves will be generated. If more than three hyperbolic curves are generated, then the number of neighboring intersection points in each set of valid intersection points will also be more than three.

Following task 179, a task 180 accurately locates each of the set of valid intersection points 100', 100", 100''' used with the selected starting point as an initial guess for each of valid intersection points 100', 100", 100'''. The starting point is input into the Newton-Raphson curve fitting process. The curve fitting process is performed to solve a pair of equations for hyperbolic curves 88 and 90 that define valid intersection point 100'. The iterative refinement of valid intersection point 100' produces a more accurate location for intersection point 100'.

Likewise, the Newton-Raphson curve fitting process is repeated with the selected starting point to solve a pair of equations for hyperbolic curves 88 and 96 for iterative refinement of valid intersection point 100". The Newton-Raphson curve fitting process is again repeated with the selected starting point to solve the pair of equations for hyperbolic curves 90 and 96 for iterative refinement of valid intersection point 100'''.

After task 180, a task 182 obtains a probable location for cellular radiotelephone 24 (FIG. 1) in response to the refined locations of intersection points 100', 100", and 100'''. The probable location is estimated as the centroid of first cluster area 104 (FIG. 8) defined by the refined locations of intersection points 100', 100", and 100'''. The east-west coordinate of the centroid is estimated as the average of the east-west coordinates of refined intersection points 100', 100", and 100''', and the north-south coordinate of the centroid is estimated as the average of the north-south coordinates of intersection points 100', 100", and 100'''. Following task 182, calculation routine 148 returns program control to a task 170 of location process 110 (FIG. 9).

Referring to FIG. 9, task 170 transfers the probable location determined from calculation routine 148 to PSAP 42 (FIG. 1) or another party which may request the probable location. The probable location may be converted to latitude and longitude coordinates that are overlaid onto a mapping system or converted into a street address or distance marker along a highway. Geographical location computer 20 may transfer probable location information directly to PSAP 42 through PSTN 40 (FIG. 1).

Following task 170, a query task 184 determines if geographical location process 110 should be repeated. A repeat measurement may be desired if cellular radiotelephone 24 is moving about within cell 34 (FIG. 1) such as if the emergency caller is fleeing from a dangerous situation. A command to repeat location process could be entered by PSAP 42 (FIG. 1). Alternatively, upon activation by receipt of notice 46 (FIG. 1), geographical location computer 20 may periodically repeat call locate calculations based on incoming and possibly changing timing parameters from dual channel receivers 56, 58, 60, and 61. Additional measurements may increase location accuracy and provide a tracking reference if cellular radiotelephone 24 is moving about within cell 34.

In query task 184, if another probable location estimate is desired, process 110 proceeds to query task 186. Query task 186 determines if dual channel receivers 56, 58, 60, and 61 are already tuned to the forward and reverse directions of bidirectional channel 32 (FIG. 1) in response to the call locate instruction transmitted over command link 50 (FIG. 1). If geographical location computer 20 determines that dual channel receivers 56, 58, 60, and 61 are still tuned to bidirectional channel 32, process 110 loops back to receiving subprocess 118 to receive updated timing parameters and perform subsequent calculations. This updated probable location estimate can than be transferred to PSAP 42.

In query task 186, if geographical location computer determines that dual channel receivers 56, 58, 60, and 61 are not tuned to bidirectional channel 32 process 110 loops back to task 114 to transmit a new call locate instruction over command link 50 to tune receivers 56, 58, 60, and 61 to bidirectional channel 32. This situation may arise if call location process 110 was initiated for another cellular radiotelephone following initial activation of the location process for cellular radiotelephone 24. In addition, geographical location computer 20 may determine that cellular radiotelephone 24 has moved out of cell 34 in which case geographical location computer 20 may be required to select a new set of dual channel receivers and tune them to bidirectional channel 32.

Process 110 continues for the call originating from cellular radiotelephone 24 until no further probable location estimates are desired. This could occur after a single location estimate, a certain limited quantity of location estimates is acquired, when PSAP 42 no longer signals for an additional probable location estimate, or when the call ends.

In summary, the present invention provides a method and system for accurately determining location of a cellular radiotelephone engaged in a call, repeating location measurements as desired throughout the duration of a call. This invention mitigates the deleterious effects of error components to location measurements, and no changes to the general population of existing cellular radiotelephones and base stations are required.

Although the preferred embodiments of the invention have been illustrated and described in detail, it will be readily apparent to those skilled in the art that various modifications may be made therein without departing from the spirit of the invention or from the scope of the appended claims. For instance an equivalent system can be employed that allows communication of the geographical location system to both the AMPS A-side and B-side systems such that both systems can work cooperatively, increasing the number of dual channel receivers in a given area to more accurately locate cellular radiotelephones. Additionally, the present invention can be extended to cellular radiotelephones operating in the time division multiple access (TDMA) or code division multiple access (CDMA) mode by selecting signals typically carried on their respective forward and reverse channels.

What is claimed is:

1. A method of operating a geographical location system in a cellular network to determine the location of a cellular radiotelephone engaged in a call involving a cellsite base station, said call being conducted over a bidirectional channel having forward and reverse directions, said method comprising the steps of:

transmitting a forward location signal during said call over said forward direction of said bidirectional channel;

tuning a plurality of dual channel receivers to said bidirectional channel;

receiving said forward location signal and a reverse location signal over said bidirectional channel at each of said dual channel receivers; and calculating a probable location of said cellular radiotelephone in response to said forward and reverse location signals received at each of said dual channel receivers.

2. A method as claimed in claim 1 wherein:

said method additionally comprises the step of receiving said reverse location signal at said cellsite base station; and said calculating step calculates said probable location in response to said reverse location signal received at said cellsite base station.

3. A method as claimed in claim 1 additionally comprising the step of obtaining a notice of said call from a mobile telephone switching office (MTSO), said notice conveying said bidirectional channel over which said call is being conducted and a cell identification code identifying said cellsite base station.

4. A method as claimed in claim 1 wherein each of said dual channel receivers is associated with a dual channel receiver controller, and said tuning step additionally comprises the steps of:

transmitting a call locate instruction to said dual channel receiver controllers, said call locate instruction identifying said bidirectional channel; and configuring each of said dual channel receivers to detect said forward and reverse directions of said bidirectional channel.

5. A method as claimed in claim 1 wherein:

said call conveys subscriber conversation signals; and said call conveys said forward and reverse location signals concurrently with said subscriber conversation signals.

6. A method as claimed in claim 1 wherein said bidirectional channel is a voice channel having forward and reverse directions.

7. A method as claimed in claim 6 wherein said cellular network is compatible with an advanced mobile phone service (AMPS) cellular system, said forward location signal is a supervisory audio tone (SAT), and said receiving step comprises the steps of:

receiving said SAT transmitted from said cellsite base station over said forward direction of said voice channel;

receiving a transponded SAT from said radiotelephone over said reverse direction of said voice channel; and measuring a phase difference between said SAT and said transponded SAT to determine an interpath time delay.

8. A method as claimed in claim 1 wherein:

said cellular radiotelephone transponds said forward location signal over said reverse direction of said bidirectional channel to produce said reverse location signal;

said method additionally comprises the step of measuring a phase difference, at each of said dual channel receivers, between said forward and reverse location signals to determine an interpath time delay, said interpath time delay having a transpond turnaround component and a propagation component; and said calculating step comprises the step of eliminating said transpond turnaround component of said interpath time delays measured at each of said dual channel receivers.

9. A method as claimed in claim 8 wherein said eliminating step further comprises the steps of:

receiving said reverse location signal over said bidirectional channel at said cellsite base station;

determining a base station interpath time delay, said base station interpath time delay having said transpond turnaround component and a base station propagation component; and subtracting said base station interpath time delay from each of said interpath time delays measured at each of said dual channel receivers.

10. A method as claimed in claim 1 wherein said cellular radiotelephone transponds said forward location signal over said reverse direction of said bidirectional channel to produce said reverse location signal, said forward location signal exhibits a forward frequency, said reverse location signal exhibits a reverse frequency, and said method additionally comprises, at each of said dual channel receivers, the steps of:

doubling said forward frequency to produce a doubled forward frequency;

doubling said reverse frequency to produce a doubled reverse frequency; and measuring a phase difference between said doubled forward and said reverse frequencies.

11. A method as claimed in claim 10 wherein:

said phase difference is a doubled-signal phase difference measurement; and said measuring step further comprises the step of dividing said doubled-signal phase difference measurement in half to produce a halved-signal phase difference measurement corresponding to a difference between said forward frequency and said reverse frequency.

12. A method as claimed in claim 1 wherein:

said cellsite base station comprises an antenna;

each of said dual channel receivers comprises an antenna; and said method additionally comprises the step of determining locations of said cellsite antenna and each of said dual channel receiver antennas.

13. A method as claimed in claim 12 wherein said determining and said calculating steps are performed at a geographical location computer, and said method additionally comprises the steps of:

measuring timing parameters of said forward and reverse location signals at each of said dual channel receivers; and obtaining said timing parameters from each of said dual channel receivers at said geographical location computer.

14. A method as claimed in claim 1 wherein said cellsite base station manages a cell of said cellular network, and said calculating step comprises the steps of:

generating a first curve for a first one of said dual channel receivers such that said radiotelephone resides proximate to said first curve;

generating a second curve for a second one of said dual channel receivers such that said radiotelephone resides proximate to said second curve, said second curve intersecting said first curve at two or more intersection points; and selecting one of said two or more points as said probable location, said selected one point being positioned inside said cell.

15. A method as claimed in claim 14 wherein:

said method further comprises the step of generating a third curve for a third one of said dual channel receivers such that said radiotelephone resides proximate to said third curve, said third curve intersecting said first and said second curves, to form a plurality of said intersection points; and said selecting step further comprises the step of identifying a plurality of valid intersection points from said plurality of intersection points, said valid intersection points falling within a maximum search range centered at said cellsite base station.

16. A method as claimed in claim 15 wherein:

a set of valid intersection points includes one of said valid intersection points from said intersection of said first and second curves, one of said valid intersection points from said intersection of said first and third curves, and one of said valid intersection points from said intersection of said second and third curves;

said first, second, and third curves produce a plurality of said sets of valid intersection points; and said method additionally comprises the step of identifying one of said plurality of sets which is encompassed within a minimum area.

17. A method as claimed in claim 16 additionally comprising the steps of:

selecting a starting point in response to said one identified set;

performing a Newton-Raphson curve fitting process to solve a pair of equations for said first and second curves defining a first one of said valid intersection points of said identified one set, said starting point serving as an initial guess for iterative refinement of said first point by said process;

repeating said curve fitting process to solve a pair of equations for said first and third curves defining a second one of said valid intersection points of said set, said starting point serving as an initial guess for iterative refinement of said second point by said process;

repeating said curve fitting process to solve a pair of equations for said second and third curves defining a third one of said valid intersection points of said set, said starting point serving as an initial guess for iterative refinement of said third point by said process; and estimating said probable location in response to said refined first, second, and third points.

18. A method as claimed in claim 1 wherein said receiving and calculating steps are periodically repeated to track movement of said radiotelephone.

19. A method as claimed in claim 1 wherein said call is an emergency call, and said method additionally comprises the step of transferring said probable location to a public safety answering position (PSAP).

20. A method as claimed in claim 1 wherein said tuning, receiving, and calculating steps are repeated during said call.

21. A geographical location system in a cellular network for determining the location of a cellular radiotelephone engaged in a call through a cellsite base station, said system comprising:

a geographical location computer activated upon receipt of a notice identifying a bidirectional channel over which said call is being conducted and a cell identification code defining a cell in which said call was detected, said bidirectional channel having a forward direction and a reverse direction, said geographical location computer transmitting a call locate instruction identifying said bidirectional channel upon activation; and a plurality of dual channel receivers, located proximate to said cell in which said call was detected and being in data communication with said geographical location computer, for receiving a forward location signal over said forward direction of said bidirectional channel and a reverse location signal over said reverse direction of said bidirectional channel in response to said call locate instruction.

22. A system as claimed in claim 21 wherein said system further comprises a plurality of dual channel receiver controllers, each of said dual channel receiver controllers being coupled to corresponding ones of said dual channel receivers, and each of said dual channel receiver controllers being configured to:

obtain said call locate instruction;

tune each of said dual channel receivers to detect said forward direction and said reverse direction of said bidirectional channel;

receive said forward location signal and said reverse location signal;

measure timing parameters of said forward and reverse location signals; and transmit said timing parameters to said geographical location computer.

23. A system as claimed in claim 22 wherein said cellsite base station comprises an antenna, each of said dual channel receivers comprises an antenna, and said geographical location computer is configured to:

store location information for said cellsite antenna and each of said dual channel receiver antennas;

receive said timing parameters from each of said plurality of dual channel receiver controllers; and calculate a probable location of said cellular radiotelephone in response to said timing parameters.

24. A system as claimed in claim 21 wherein said cellsite base station manages a cell of said cellular network, and said geographical location computer is configured to:

generate a first curve for a first one of said dual channel receivers such that said radiotelephone resides proximate to said first curve;

generate a second curve for a second one of said dual channel receivers such that said radiotelephone resides proximate to said second curve, said second curve intersecting said first curve at two or more intersection points; and select one of said two or more points as said probable location, said selected one point being positioned inside said cell.

25. A method of operating a geographical location system in an advanced mobile phone service (AMPS) network having A-side and B-side cellular systems, said method determining a location of a cellular radiotelephone engaged in a call, and said method comprising the steps of:

detecting said call from said cellular radiotelephone through a first one of an A-side cellsite base station and a B-side cellsite base station, said call being conducted over a bidirectional channel having a forward voice channel and a reverse voice channel;

transmitting a supervisory audio tone (SAT) during said call over said forward voice channel of said bidirectional channel, said call conveying said SAT concurrently with subscriber conversation signals;

tuning a plurality of dual channel receivers to said bidirectional channel, said dual channel receivers being located at A-side and B-side cellsites;

receiving said SAT transmitted from said first one of said A-side and B-side cellsite base stations over said forward voice channel at each of said dual channel receivers;

receiving a transponded SAT from said radiotelephone over said reverse voice channel at each of said dual channel receivers;

measuring a phase difference, at each of said dual channel receivers to determine an interpath time delay; and calculating a probable location of said radiotelephone in response to said interpath time delays and locations of said A-side and B-side cellsites where said dual channel receivers are located.

26. A method as claimed in claim 25 wherein said calculating step is performed at a geographical location computer in data communication with said dual channel receivers, and said method additionally comprises the steps of:

measuring timing parameters of said SAT and said transponded SAT at each of said dual channel receivers; and obtaining said timing parameters from each of said dual channel receivers at said geographical location computer.

27. A method as claimed in claim 25 wherein said first one of said A-side and B-side cellsite base stations manages a cell of said cellular network, and said calculating step comprises the steps of:

generating a first curve for a first one of said dual channel receivers such that said radiotelephone resides proximate to said first curve;

generating a second curve for a second one of said dual channel receivers such that said radiotelephone resides proximate to said second curve;

generating a third curve for a third one of said dual channel receivers such that said radiotelephone resides proximate to said third curve;

identifying a plurality of intersection points between said first, said second, and said third curves;

identifying a plurality of valid intersection points from said plurality of intersection points, said valid intersection points falling within a maximum search range centered at said first one of said A-side and B-side cellsite base stations; and generating a set of valid intersection points, said set including one of said valid intersection points from said intersection of said first and second curves, one of said valid intersection points from said intersection of said first and third curves, and one of said valid intersection points from said intersection of said second and third curves;

producing a plurality of said sets of valid intersection points from said valid intersection points of said first, second, and third curves; and identifying one of said plurality of sets which is encompassed within a minimum area.

\* \* \* \* \*

UNITED STATES PATENT AND TRADEMARK OFFICE
CERTIFICATE OF CORRECTION

PATENT NO. : 6,026,305  
DATED : February 15, 2000  
INVENTOR(S) : Sheldon N. Salinger and Douglas G. Foster Page 1 of 2

It is certified that error appears in the above-indentified patent and that said Letters Patent is hereby corrected as shown below:

Column 3, line 64, delete "dual-channel" and insert -- dual channel --
(Patent Application page 6, line 26);

Column 10, line 20, delete " $\sqrt{(x_B - x)^2 + (y_8 - y)^2}$ " and insert -- $\sqrt{(x_B - x)^2 + (y_B - y)^2}$ --
(Patent Application page 19, line 4);

Column 10, line 27, delete " $\sqrt{(x_A - x)^2 + (y_A - y^2)}$ " and insert -- $\sqrt{(x_A - x)^2 + (y_A - y)^2}$ --
(Patent Application page 19, line 9);

Column 11, line 18, delete "$M^2-4LN<0$" and insert -- $M^2-4LN>0$ --
(Patent Application page 20, line 27).

Column 13, line 57, delete "100", 100'" and insert -- 100', 100" --
(Patent Application page 26, line 3);

Column 13, line 59, delete "100", 100'" and insert -- 100', 100" --
(Patent Application page 26, line 5);

UNITED STATES PATENT AND TRADEMARK OFFICE
CERTIFICATE OF CORRECTION

PATENT NO. : 6,026,305
DATED : February 15, 2000
INVENTOR(S) : Sheldon N. Salinger and Douglas G. Foster It is certified that error appears in the above-indentified patent and that said Letters Patent is hereby corrected as shown below:

Column 14, line 12, delete "100", 100'" and insert -- 100', 100" --
(Patent Application page 26, line 25);

Column 14, line 25, delete "100", 100'" and insert -- 100', 100" --
(Patent Application page 27, line 25);

Column 14, line 27, delete "100", 100'" and insert -- 100', 100" --
(Patent Application page 27, line 6);

Column 19, line 56, delete "100", 100'" and insert -- 100', 100" --
(Patent Application page 37, line 25);

Signed and Sealed this

Twenty-fourth Day of April, 2001

Attest:

NICHOLAS P. GODICI

*Attesting Officer*    *Acting Director of the United States Patent and Trademark Office*